(12) United States Patent
Mashimo et al.

(10) Patent No.: US 8,904,901 B2
(45) Date of Patent: Dec. 9, 2014

(54) STEERING DEVICE

(75) Inventors: Masayoshi Mashimo, Maebashi (JP);
Tadashi Hibino, Maebashi (JP); Tooru Matsushima, Maebashi (JP); Tetsuo Arakawa, Maebashi (JP)

(73) Assignee: NSK Ltd., Tokyo (JP)

( * ) Notice: Subject to any disclaimer, the term of this patent is extended or adjusted under 35 U.S.C. 154(b) by 361 days.

(21) Appl. No.: 13/059,733

(22) PCT Filed: Dec. 1, 2010

(86) PCT No.: PCT/JP2010/071451
§ 371 (c)(1),
(2), (4) Date: Aug. 7, 2012

(87) PCT Pub. No.: WO2011/070950
PCT Pub. Date: Jun. 16, 2011

(65) Prior Publication Data
US 2012/0297917 A1    Nov. 29, 2012

(30) Foreign Application Priority Data

Dec. 11, 2009  (JP) ................................. 2009-281176
Oct. 8, 2010   (JP) ................................. 2010-228044
Nov. 17, 2010  (JP) ................................. 2010-256629

(51) Int. Cl.
*B62D 1/00*     (2006.01)
*B62D 1/184*    (2006.01)

(52) U.S. Cl.
CPC ..................................... *B62D 1/184* (2013.01)
USPC ............................................ 74/492; 280/775

(58) Field of Classification Search
None
See application file for complete search history.

(56) References Cited

U.S. PATENT DOCUMENTS 7,367,588 B2 *  5/2008  Yamada ......................... 280/777
8,540,280 B2 *  9/2013  Ishii et al. ...................... 280/777
8,596,160 B2 * 12/2013  Nagamura et al. ............... 74/492
8,596,683 B2 * 12/2013  Ishii ............................... 280/775

* cited by examiner

*Primary Examiner* — David M Fenstermacher
(74) *Attorney, Agent, or Firm* — Crowell & Moring LLP

(57) ABSTRACT

A steering device is provided that facilitates an operation of mounting a friction plate on a mounting bracket. A first friction plate and a second friction plate just need to be mounted on an outer column only. It is possible to greatly facilitate an operation of assembling alternate layers of the first friction plate and the second friction plate at specified orientations. When the outer column is displaced telescopically, a tightening rod touches a long slit in the second friction plate. The second friction plate rocks around a columnar protrusion as the rocking center. The long slit is formed lengthwise in a direction of tilt positioning. The long slit absorbs a difference between a rocking trajectory formed by the second friction plate and a linear trajectory formed by the outer column. The second friction plate smoothly rocks. The outer column can be smoothly adjusted in the telescopic direction.

9 Claims, 30 Drawing Sheets

(a)          (b)

(c)

(a)

(b)

(a)

(b)

STEERING DEVICE

TECHNICAL FIELD

The present invention relates to a steering device and more particularly to a position-adjusting steering device capable of adjusting both vertical positions and front-back positions of a steering wheel in accordance with a driver's body type or a driving posture.

BACKGROUND ART

A tilt/telescopic steering device adjusts both vertical positions and front-back positions of a steering wheel in accordance with a driver's body type or a driving posture.

Such position-adjusting steering device is provided with a clamp unit that clamps a specifically positioned column onto a side plate of a mounting bracket by tightening a tightening rod. The clamp unit uses a structure of clamping the column onto the side plate of the mounting bracket through the intermediary of a friction plate (Patent Documents 1 and 2) because the steering device needs to be rigid enough for clamping, provide stable clamping force, and facilitate an unclamp operation.

Such clamp unit uses a layer of friction plates in order to generate large clamping force. A clamp unit described in Patent Document 1 uses a tilt friction plate and a telescopic friction plate in order to increase the clamping rigidity in both the tilt direction and the telescopic direction. The tilt friction plate is extended in the tilt positioning direction and is fixed to the mounting bracket. The telescopic friction plate is extended in the telescopic positioning direction and is fixed to the column. According to a clamp unit described in Patent Document 2, the tilt friction plate is extended in the tilt positioning direction and is fixed to an outer column. The telescopic friction plate is extended in the telescopic positioning direction and is fixed to an inner column.

However, technical skills are required to assemble alternate layers of differently shaped tilt friction plates and telescopic friction plates according to specified directions. The assembly operation is especially difficult when the tilt friction plates and the telescopic friction plates are fixed to different positions.

PRIOR ART DOCUMENTS

Patent Documents

Patent Document 1: JP-A No. 1998-335491
Patent Document 2: JP-A No. 2008-100597

SUMMARY OF THE INVENTION

Problem to be Solved by the Invention

It is an object of the invention to provide a steering device capable of facilitating an operation of assembling a friction plate on a mounting bracket.

Means for Solving the Problem

The above-mentioned object is achieved as follows. According to a first aspect of the present invention, there is provided a steering device including: a mounting bracket attachable to a vehicle body; a column that is supported by the mounting bracket so as to be capable of adjusting a telescopic position and rotatably supports a steering shaft mounted with a steering wheel; a first friction plate that is formed lengthwise in a direction of the telescopic position adjustment and is fixed to the column by a fixing section in order to disable relative movement; a second friction plate that overlaps with the first friction plate and is rockingly supported by a first rocking support section on the column; a tightening rod that clamps the column onto the mounting bracket at a specified telescopic position through the first friction plate and the second friction plate overlapping with each other; a telescopic adjustment long slit that is formed in the first friction plate lengthwise in a telescopic positioning direction and allows the tightening rod to be inserted; and a long slit that is formed in the second friction plate and allows the tightening rod to be inserted.

According to a second aspect of the present invention, the steering device according to the first aspect of the present invention is provided as follows. The second friction plate is formed lengthwise in a direction orthogonal to a telescopic positioning direction.

According to a third aspect of the present invention, the steering device according to the first aspect of the present invention is provided as follows. The second friction plate is formed lengthwise in a direction orthogonal to a telescopic positioning direction and in the telescopic positioning direction.

According to a fourth aspect of the present invention, the steering device according to the first aspect of the present invention is provided as follows. The long slit in the second friction plate is formed lengthwise toward the first rocking support section of the second friction plate.

According to a fifth aspect of the present invention, the steering device according to the first aspect of the present invention includes a tilt adjustment long slit that is formed in the mounting bracket lengthwise in a tilt positioning direction and allows the tightening rod to be inserted. The mounting bracket supports the column so as to be able to adjust a tilt position and a telescopic position.

According to a sixth aspect of the present invention, the steering device according to the first aspect of the present invention is provided as follows. The first friction plate and the second friction plate are sandwiched between an inner surface of a side plate for the mounting bracket and the column.

According to a seventh aspect of the present invention, the steering device according to the sixth aspect of the present invention is provided as follows. The first rocking support section includes a columnar protrusion formed on the second friction plate and a circular recess that is formed in the column and rockingly supports the columnar protrusion.

According to an eighth aspect of the present invention, the steering device according to the sixth aspect of the present invention includes: a telescopic adjustment long slit that is formed in the mounting bracket longwise in a tilt positioning direction and allows the tightening rod to be inserted; a third friction plate that is sandwiched between the first friction plate and the sideplate of the mounting bracket and is rockingly supported by a second rocking support section on the side plate of the mounting bracket; and a long slit that is formed in the third friction plate lengthwise toward the second rocking support section and allows the tightening rod to be inserted.

According to a ninth aspect of the present invention, the steering device according to the sixth aspect of the present invention includes: a cylindrical hole formed in the first rocking support section of the second friction plate; and a protrusion that is formed on the first friction plate and is fit into the cylindrical hole to rockingly support the second friction plate.

Effect of the Invention

A steering device according to the present invention includes a first friction plate, a second friction plate, a tightening rod, a telescopic adjustment long slit, and a long slit. The first friction plate is formed lengthwise in a direction of the telescopic position adjustment and is fixed to the column by a fixing section in order to disable relative movement. The second friction plate overlaps with the first friction plate and is rockingly supported by a first rocking support section on the column. The tightening rod clamps the column onto the mounting bracket at a specified telescopic position through the first friction plate and the second friction plate overlapping with each other. The telescopic adjustment long slit is formed in the first friction plate lengthwise in a telescopic positioning direction and allows the tightening rod to be inserted. The long slit is formed in the second friction plate and allows the tightening rod to be inserted.

The first friction plate and the second friction plate just need to be mounted on the column only. It is possible to facilitate an operation of assembling alternate layers of the first friction plate and the second friction plate at specified orientations.

The long slit is formed in the second friction plate lengthwise in a direction orthogonal to a telescopic positioning direction. When the column is adjusted in the telescopic direction, the tightening rod touches the long slit and the second friction plate rocks around the columnar protrusion as the rocking center. The long slit absorbs a difference between a circular trajectory formed by the rocking second friction plate and a linear trajectory formed by the straight moving column. The second friction plate smoothly rocks. The column can be smoothly adjusted in the telescopic direction.

A bolt may be screwed into the column through a bolt hole in the second friction plate and rockingly support the second friction plate against the column. The second friction plate can be reliably fixed to the column.

The second friction plate may be formed lengthwise in a direction orthogonal to a telescopic positioning direction and in the telescopic positioning direction. This makes it possible to increase the area in contact with the first friction plate and stabilize the holding force for fastening in the tilt direction and the telescopic direction.

A third friction plate may be sandwiched between the first friction plate and the side plate of the mounting bracket and may be rockingly supported against the side plates. It is possible to increase the contact area between the third friction plate and the side plate regardless of adjustment positions in the tilt direction and therefore increase the holding force in the tilt direction.

BEST MODE FOR CARRYING OUT THE INVENTION

The following embodiments describe examples of applying the present invention to a tilt/telescopic steering device that adjusts both vertical positions and front-back positions of a steering wheel.

First Embodiment

Figure 1:
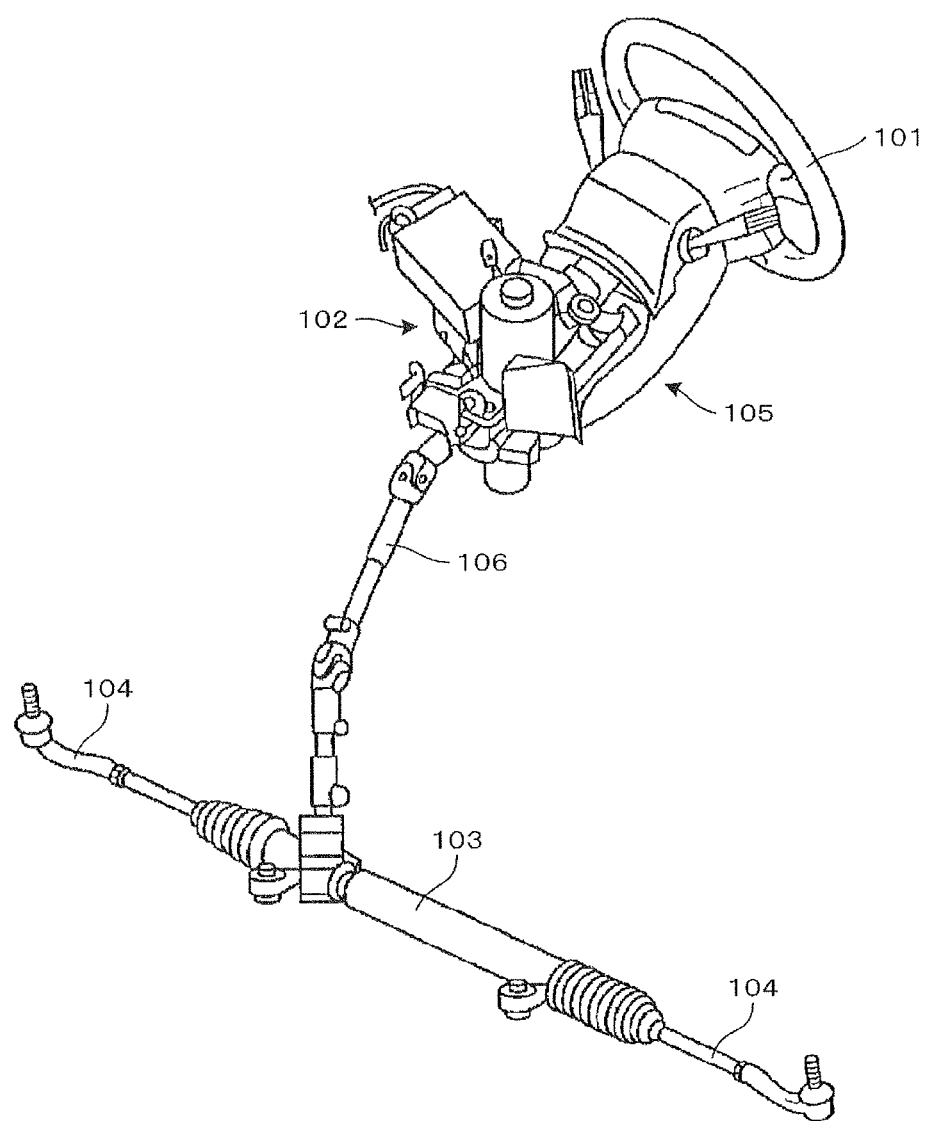
FIG. 1 is an overall perspective view showing a steering device according to a first embodiment of the present invention.

FIG. 1 is an overall perspective view showing a steering device as a column-assist rack-and-pinion power steering device according to the first embodiment of the present invention. The column-assist rack-and-pinion power steering device shown in FIG. 1 improves the operation ability of a steering wheel 101 by supplying a steering shaft with steering assist force from a steering assist section (electric assist mechanism) 102 attached to a column 105 and reciprocating a rack of a rack-and-pinion steering gear 103 through an intermediate shaft 106 to steer front wheels through a tie rod 104.

Figure 2:
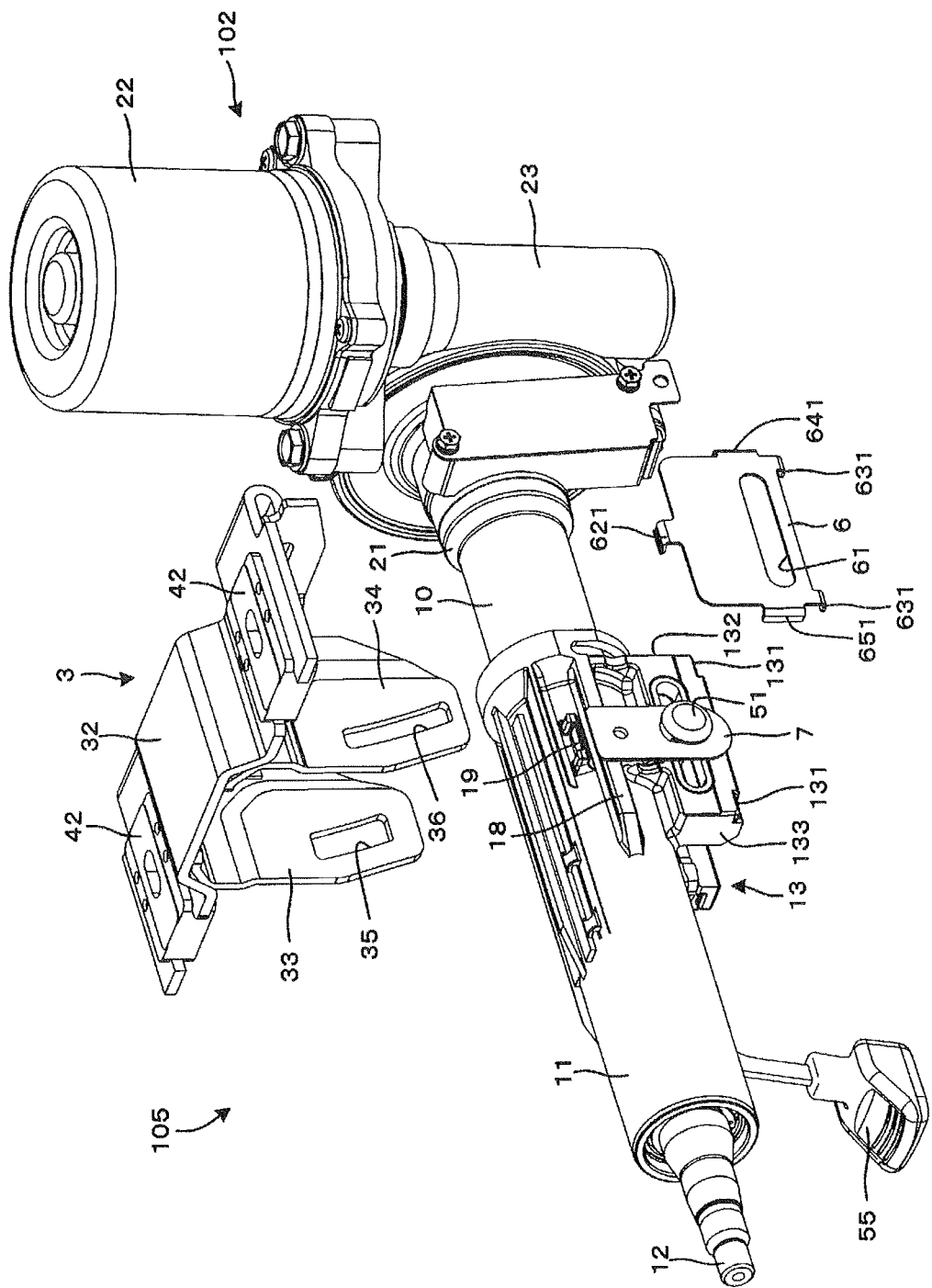
FIG. 2 is an exploded perspective view of the steering device according to the first embodiment of the invention viewed from the vehicle body rear.
Figure 3:
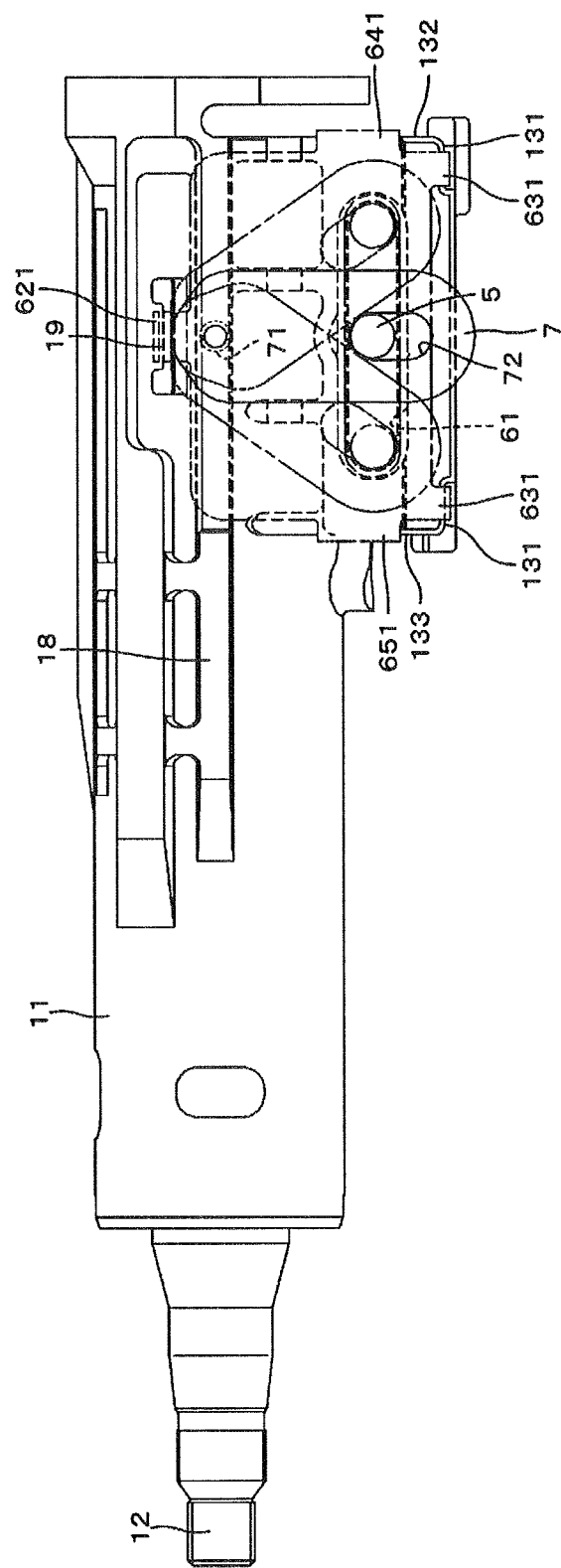
FIG. 3 is a side view of the column in FIG. 2 with the mounting bracket removed.
Figure 4:
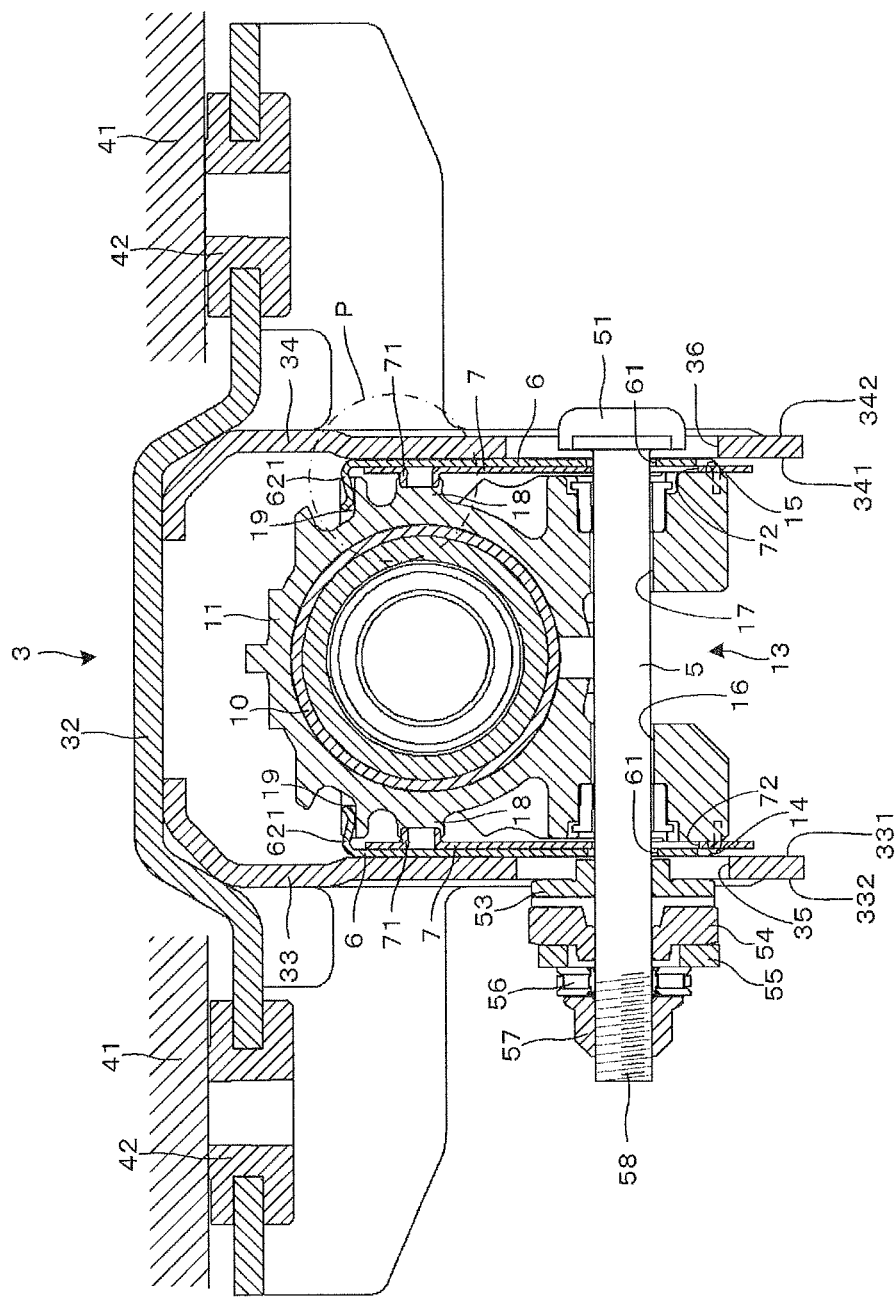
FIG. 4 is a vertical sectional view of FIG. 2.
Figure 5:
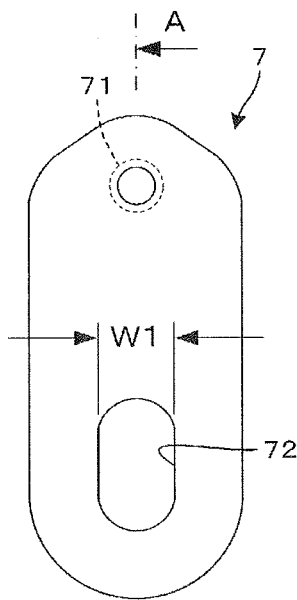
FIG. 5 is a parts diagram of a second friction plate alone according to the first embodiment of the invention, wherein FIG. 5 (a) is a front view of the second friction plate and FIG. 5 (b) is a sectional view taken along the line A-A in FIG. 5 (a)
Figure 5:
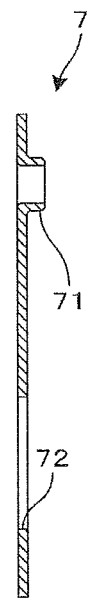
Figure 6:
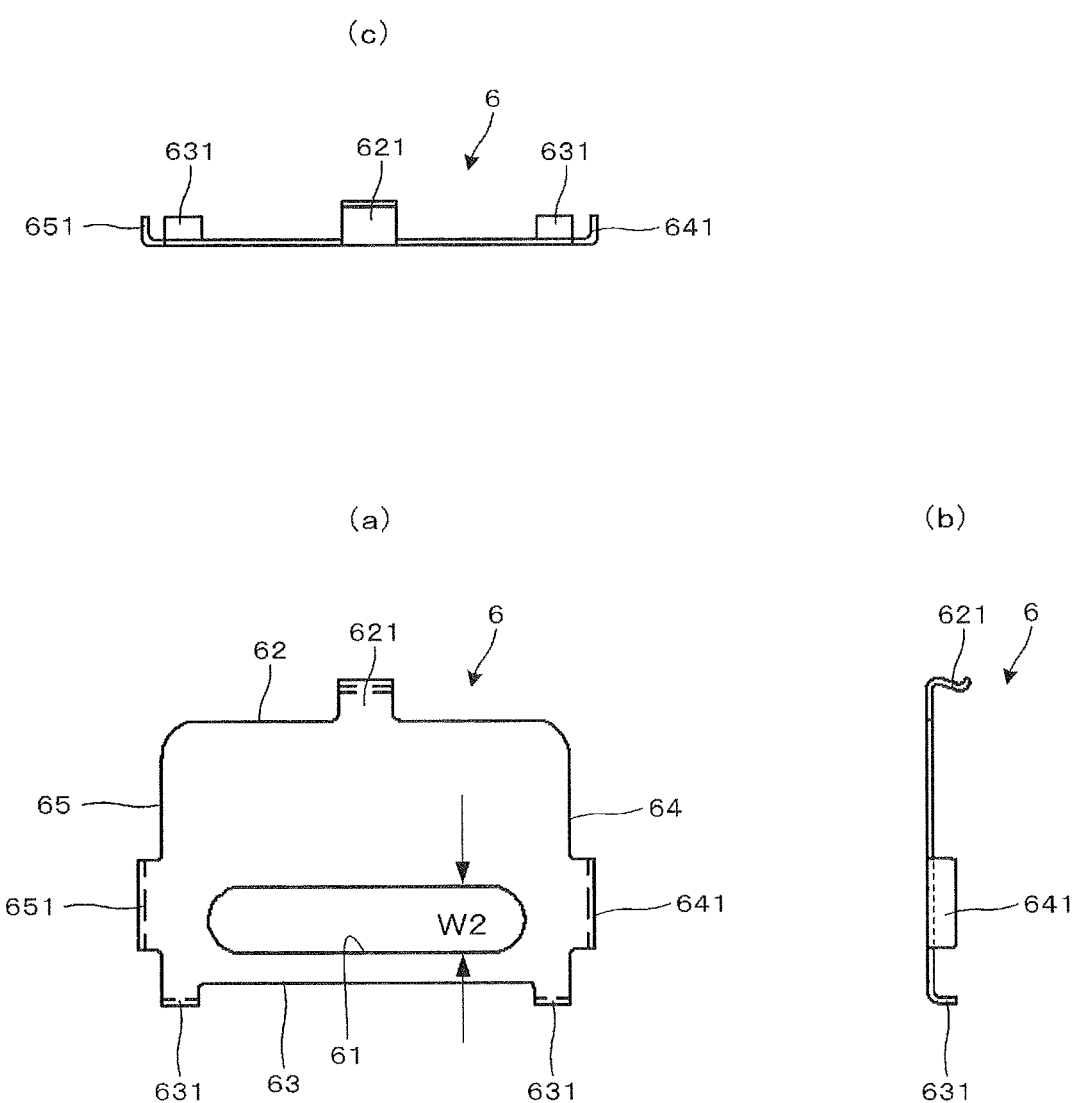
FIG. 6 is a parts diagram of a first friction plate alone according to the first embodiment of the invention, wherein FIG. 6 (a) is a front view of the first friction plate, FIG. 6 (b) is a right side view of FIG. 6 (a), and FIG. 6 (c) is a plan view of FIG. 6 (a)
Figure 7:
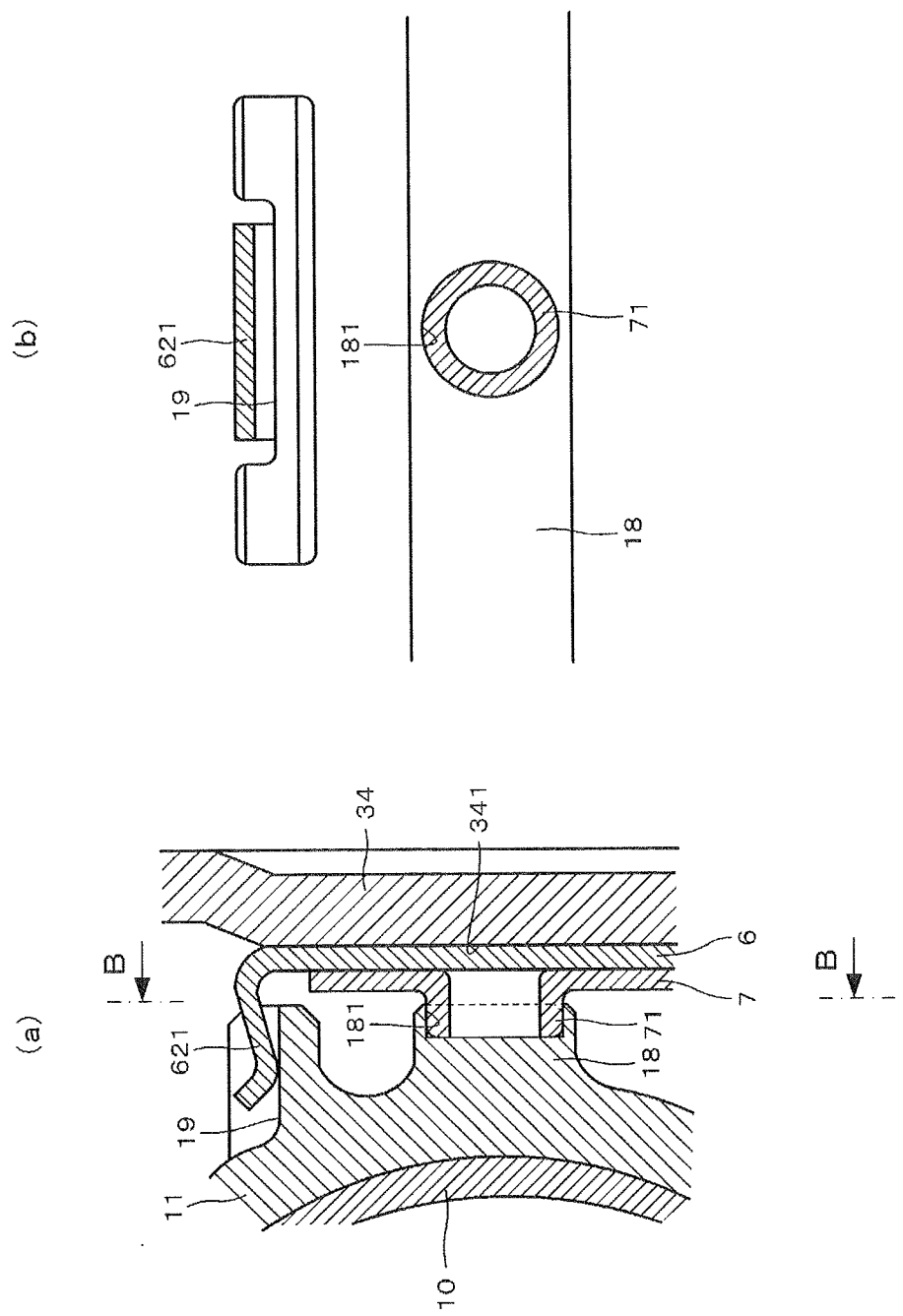
FIG. 7 (a) is an enlarged sectional view of portion P in FIG. 4 and FIG. 7 (b) is a sectional view taken along the line B-B in FIG. 7 (a)

FIG. 2 is an exploded perspective view of the steering device according to the first embodiment of the invention viewed from the vehicle body rear. FIG. 3 is a side view of the column in FIG. 2 with the mounting bracket removed. FIG. 4 is a vertical sectional view of FIG. 2. FIG. 5 is a parts diagram of a second friction plate alone according to the first embodiment of the invention. FIG. 5 (a) is a front view of the second friction plate. FIG. 5 (b) is a sectional view taken along the line A-A in FIG. 5 (a). FIG. 6 is a parts diagram of a first friction plate alone according to the first embodiment of the invention. FIG. 6 (a) is a front view of the first friction plate. FIG. 6 (b) is a right side view of FIG. 6 (a). FIG. 6 (c) is a plan view of FIG. 6 (a). FIG. 7 (a) is an enlarged sectional view of portion P in FIG. 4. FIG. 7 (b) is a sectional view taken along the line B-B in FIG. 7 (a).

As shown in FIGS. 2 through 4, an outer column 11 is fitted around an inner column 10 slidably in an axial direction. The outer column 11 rotatably supports a steering shaft 12. A steering wheel 101 in FIG. 1 is fixed to the left end (toward the vehicle body rear) of the steering shaft 12. The outer column 11 according to the embodiment of the invention is an aluminum die-cast product. Further, the outer column 11 may be configured by welding a distance bracket to a steel pipe. Alternatively, the outer column 11 may be made of a magnesium die-casting alloy for weight saving.

The mounting bracket 3 is attached to the right (toward the vehicle body front) of the outer column 11 so as to sandwich it between both sides of the mounting bracket 3. The mounting bracket 3 is detachably attached to the vehicle body front via a capsule 42 that is made of an aluminum alloy, for example, and is fixed to a vehicle body 41.

When a driver bumps against the steering wheel 101 as the second collision to generate large impact force, the mounting bracket 3 disengages from the capsule 42 toward the vehicle body front. The outer column 11, guided by the inner column 10, collapses and moves toward the vehicle body front to absorb the shock energy.

The left end of the housing for a steering assist section 102 (electric assist mechanism) is pressed and fixed to the vehicle body front side (right) of the inner column 10. The steering assist section includes an electric motor 22 and a speed-reducing gearbox 23. The steering assist section 102 is supported on the vehicle body 41 through a pivot pin (not shown) so as to be capable of tilting.

The steering assist section 102 detects a torque applied to the steering shaft 12. The steering assist section 102 drives the electric motor 22 to rotate an output shaft (not shown) with specified steering assist force. The steering assist section 102 is coupled to a steering gear 103 through the intermediate shaft 106 so that a wheel steering angle can be changed.

The mounting bracket 3 includes an upper plate 32 and side plates 33 and 34 that extend from the upper plate 32 downward. A distance bracket 13 is formed integrally with the outer column 11 so as to protrude from the outer column 11 downward.

Tilt adjustment long slits 35 and 36 are formed in the side plates 33 and 34 of the mounting bracket 3. The tilt adjustment long slits 35 and 36 are formed circularly around the pivot pin. Telescopic adjustment long slits 16 and 17 are formed in the distance bracket 13. The telescopic adjustment long slits 16 and 17 extend left and right in FIG. 4 and lengthwise in the direction of the shaft of the outer column 11.

A tightening rod 5 is formed like a round bar and is inserted from the right side of FIG. 4 through the tilt adjustment long slits 35 and 36 and the telescopic adjustment long slits 16 and 17. A cylindrical head section 51 is formed at the right end of the tightening rod 5. The left end face of the head section 51 of the tightening rod 5 touches a lateral surface 342 of the right side plate 34.

A first friction plate 6 (see FIG. 6) and a second friction plate 7 (see FIG. 5) are overlapped with each other and are sandwiched between the inner surface 331 of the side plate 33 of the mounting bracket 3 and a side surface 14 of the distance bracket 13 and between the inner surface 341 of the side plate 34 of the mounting bracket 3 and a side surface 15 of the distance bracket 13. The second friction plates 7 are placed in contact with the side surfaces 14 and 15 of the distance bracket 13. The first friction plates 6 hold the second friction plates 7 from the outside along the vehicle width direction and are placed in contact with the inner surfaces 331 and 341 of the side plates 33 and 34.

As shown in FIG. 5, the second friction plate 7 is ovally formed to be lengthwise along the direction of tilt positioning (vertical direction in FIG. 5). A columnar protrusion 71 is formed integrally with the second friction plate 7 at its top. A long slit 72 is formed at the bottom along the direction of tilt positioning (vertical direction in FIG. 5). The tightening rod 5 is inserted into the long slit 72. The long slit 72 is formed lengthwise toward the center of the columnar protrusion 71.

The long slit 72 has a width W1 with a slight gap for allowing the tightening rod 5 to pass through.

Linear ribs 18 are formed on the outer curved surface corresponding to both sides near the shaft center of the outer column 11. Circular recesses 181 are formed on the side surfaces of the linear ribs 18. The columnar protrusion 71 of the second friction plate 7 is fit into the circular recess 181. The circular recess 181 rockingly supports the columnar protrusion 71. Accordingly, the outer column 11 rockingly supports the second friction plate 7 at the columnar protrusion 71 as the rocking center. The columnar protrusion 71 and the circular recess 181 configure a first rocking support section that rockingly supports the second friction plate 7 in conjunction with the outer column 11.

As shown in FIG. 6, a first friction plate 6 is formed lengthwise along the telescopic positioning direction (left and right in FIG. 6 (a)). A telescopic adjustment long slit is formed lengthwise along the telescopic positioning direction (left and right in FIG. 6 (a)) at the bottom of the first friction plate 6. The tightening rod 5 is inserted into the telescopic adjustment long slit 61. The telescopic adjustment long slit 61 in the first friction plate 6 is shaped equally to the telescopic adjustment long slits 16 and 17 in the distance bracket 13. The telescopic adjustment long slit 61 has a width W2 with a slight gap for allowing the tightening rod 5 to pass through.

Bent portions (engaging protrusions) 621, 631, 641, and 651 are formed on a top side 62, a bottom side 63, a right side 64, and a left side 65 of the first friction plate 6. As viewed in FIG. 6 (a), the bent portions 621, 631, 641, and 651 are bent farther from the observing point. The bent portions 631, 641, and 651 are bent at right angles farther from the observing point in FIG. 6 (a). Only the bent portion 621 on the top side is bent at an angle larger than the right angle farther from the observing point and is then bent upward circularly.

As shown in FIGS. 2, 3, 4, and 7, a rectangular recess (engaging recess) 19 is formed on the side surface near the shaft center of the outer column 11. Rectangular recesses (engaging recesses) 131 are formed at the bottom of the side surfaces 14 and 15 of the distance bracket 13.

When the first friction plate 6 is pressed against the side surfaces 14 and 15 of the distance bracket 13, the bent portion 621 of the first friction plate 6 is fit into a rectangular recess 19. When fit into the rectangular recess 19, the bent portion 621 is elastically deformed upward with reference to the vehicle body and is strongly pressed against the rectangular recess 19. The bent portions 631 of the first friction plate 6 are fit into rectangular recesses 131 in the side surfaces 14 and 15. The bent portion 641 engages with a front surface 132 of the distance bracket 13. The bent portion 651 engages with a rear surface 133 of the distance bracket 13.

Accordingly, the first friction plate 6 is prevented from moving in the vertical direction and the length direction of the vehicle in relation to the outer column 11. The first friction plate 6 is fixed to the outer column 11 in order to disable relative movement. Just pressing the first friction plate 6 against the side surfaces 14 and 15 of the distance bracket 13 fixes the first friction plate 6 to the outer column 11. This makes it possible to shorten the time to mount the first friction plate 6. The bent portions 621, 641, and 651, the rectangular recess 19, the rectangular recesses 131, the front surface 132, and the rear surface 133 configure a fixing section that fixes the first friction plate 6 to the outer column 11 in order to disable relative movement. When the first friction plate 6 is fixed to the outer column 11, the telescopic adjustment long slits 16 and 17 of the outer column 11 align with the telescopic adjustment long slit 61 of the first friction plate 6.

As mentioned above, the first friction plate 6 and the second friction plate 7 need to be attached to the outer column 11 only. It is possible to greatly facilitate an operation of assembling alternate layers of the first friction plate 6 and the second friction plate 7 at specified orientations. After the first friction plate 6 and the second friction plate 7 are assembled to the outer column 11, the outer column 11 is placed between the inner surfaces 331 and 341 of the side plates 33 and 34 of the mounting bracket 3. The tightening rod 5 is inserted from the right in FIG. 4 into the tilt adjustment long slits 35 and 36, the telescopic adjustment long slits 16 and 17, the telescopic adjustment long slit 61 in the first friction plate 6, and the long slit 72 in the second friction plate 7 to complete the assembly of the outer column 11 and the mounting bracket 3.

Around the left end of the tightening rod 5 as shown in FIG. 4, a stationary cam 53, a movable cam 54, an operation lever 55, a thrust bearing 56, and a nut 57 are externally fitted in this order. A female screw (not shown) is formed inside the nut 57 and engages with a male screw 58 formed at the left end of the tightening rod 5. The right end face of the stationary cam 53 touches a lateral surface 332 of the left side plate 33.

Complementary slant cam faces are formed at the opposing end faces of the stationary cam 53 and the movable cam 54 and are engaged with each other. The operation lever 55 is coupled with the left side surface of the movable cam 54. Manually operating the operation lever 55 rotates the movable cam 54 against the stationary cam 53.

When the operation lever 55 is moved in the clamp direction, the slant cam face of the movable cam 54 is driven on the slant cam face of the stationary cam 53 to pull the tightening rod 5 to the left in FIG. 4 and push the stationary cam 53 to the right in FIG. 5.

The left end face of the head section 51 of the tightening rod 5 pushes the right sideplate 34 to the left. The sideplate 34 is deformed inward. The inner surface 341 of the side plate 34 strongly presses the first friction plate 6 and the second friction plate 7 against a side surface 15 of the distance bracket 13.

At the same time, the right end face of the stationary cam 53 pushes the left side plate 33 to the right. The side plate 33 is deformed inward. The inner surface 331 of the side plate 33 strongly presses the first friction plate 6 and the second friction plate 7 against the side surface 14 of the distance bracket 13. In this manner, the first friction plate 6 and the second friction plate 7 can be used to firmly tighten the distance bracket 13 of the outer column 11 to the mounting bracket 3.

Consequently, the outer column 11 is fixed to the mounting bracket 3, preventing the outer column 11 from being displaced in the tilt direction and the telescopic direction. The outer column 11 is tightened to the mounting bracket 3 with large holding force in the tilt direction and the telescopic direction due to large frictional force acting between the first friction plate 6 and the second friction plate 7.

When a driver rotates the operation lever 55 in an unclamping direction, the side plates 33 and 34 of the mounting bracket 3 are restored in a direction opposite the clamping direction. The frictional force between the first friction plate 6 and the second friction plate 7 is also released.

The outer column 11 is freed from the side plates 33 and 34 of the mounting bracket 3. The tightening rod 5 is guided into the telescopic adjustment long slits 35 and 36 in the side plates 33 and 34 and is simultaneously displaced to the tilt direction so as to be able to adjust the steering wheel 101 in any tilt directions. The first friction plate 6 and the second friction plate 7 are displaced with the outer column 11 in the tilt direction.

The tightening rod 5 guides the telescopic adjustment long slit 61 of the first friction plate 6 and the telescopic adjustment long slits 16 and 17 of the distance bracket 13 to displace the outer column 11 in the telescopic direction. The steering wheel 101 can be adjusted in any telescopic directions. The first friction plate 6 is displaced with the outer column 11 in the telescopic direction.

As shown in FIG. 3, displacing the outer column 11 in the telescopic direction allows the tightening rod 5 to touch the long slit 72 in the second friction plate 7. The second friction plate 7 rocks around the columnar protrusion 71 as the rocking center. The long slit 72 is formed lengthwise along the direction of tilt positioning (vertical direction in FIG. 3). The long slit 72 absorbs a difference between a circular trajectory formed by the rocking second friction plate 7 and a linear trajectory formed by the straight moving outer column 11. The second friction plate 7 smoothly rocks. The outer column 11 can be smoothly adjusted in the telescopic direction.

The steering device according to the embodiment of the invention uses the first friction plate 6 and the second friction plate 7 sandwiched between the mounting bracket 3 and the outer column 11. The friction plates do not protrude from the mounting bracket 3, improving the steering device operability.

Second Embodiment

Figure 8:
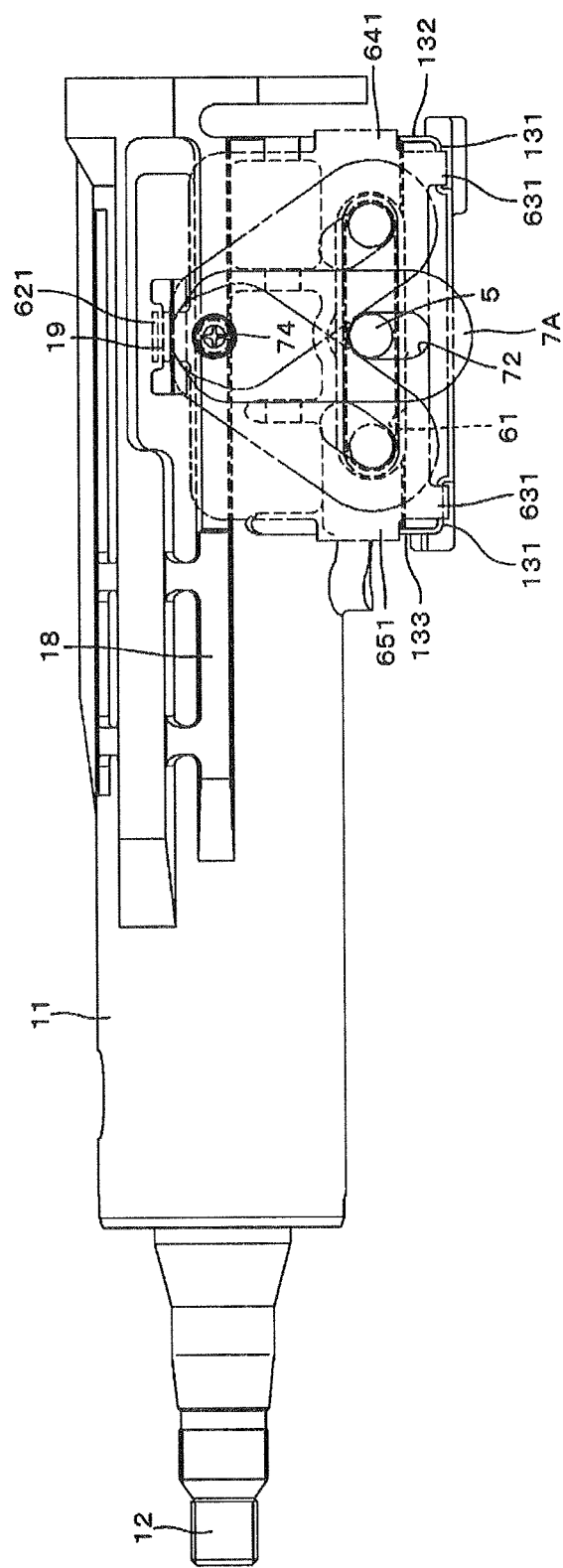
FIG. 8 is a side view of a column for a steering device according to a second embodiment of the invention and is equivalent to FIG. 3 for the first embodiment.
Figure 9:
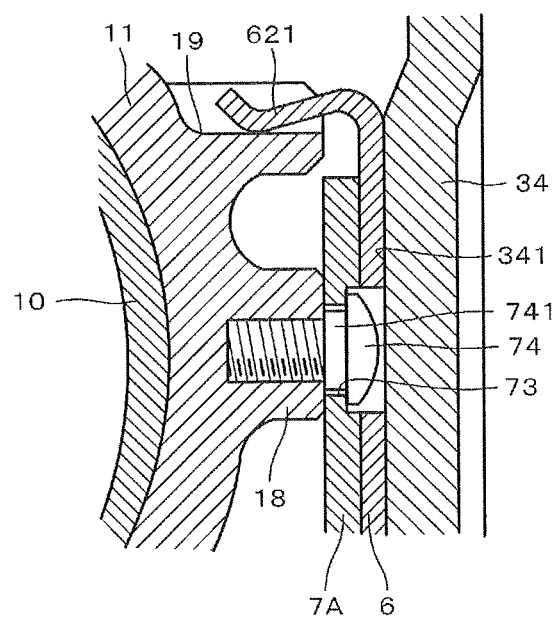
FIG. 9 is an enlarged sectional view of a first rocking support section according to the second embodiment of the invention and is equivalent to FIG. 7 (a) for the first embodiment.

The second embodiment of the invention will be described. FIG. 8 is a side view of a column for a steering device according to the second embodiment of the invention and is equivalent to FIG. 3 for the first embodiment. FIG. 9 is an enlarged sectional view of a first rocking support section according to the second embodiment of the invention and is equivalent to FIG. 7 (*a*) for the first embodiment. The following description contains only differences from the above-mentioned embodiment and omits the duplication. The same parts are depicted by the same reference numerals.

The second embodiment provides an example of modifying the first rocking support section that allows the outer column 11 to rockingly support the second friction plate. As shown in FIGS. 8 and 9, a second friction plate 7A according to the second embodiment is ovally formed to be lengthwise along the direction of tilt positioning similarly to the first embodiment. The long slit 72 is formed at the bottom along the direction of tilt positioning similarly to the first embodiment. The tightening rod 5 is inserted into the long slit 72. A circular bolt hole 73 is formed at the top of the second friction plate 7A according to the second embodiment.

A bolt 74 is inserted into the bolt hole 73 and is screwed into the side surface of a linear rib 18 for the outer column 11 to fix the second friction plate 7A to the outer column 11. Accordingly, the outer column 11 rockingly supports the second friction plate 7A at a shaft section 741 of the bolt 74 as the rocking center. The bolt hole 73 and the bolt 74 configure the first rocking support section according to the second embodiment that allows the outer column 11 to rockingly support the second friction plate 7A.

The first friction plate 6 according to the second embodiment has completely the same structure as that according to the first embodiment and a detailed description is omitted for simplicity. When the first friction plate 6 is pressed against the side surfaces 14 and 15 of the distance bracket 13, the fixing section structured equally to the first embodiment fixes the first friction plate 6 to the outer column 11 in order to disable relative movement. According to the second embodiment, the bolt 74 screwed to the outer column 11 rockingly supports the second friction plate 7A. The second friction plate 7A can be reliably fixed to the outer column 11.

When the outer column 11 dis displaced in the telescopic direction as shown in FIG. 8, the tightening rod 5 touches the long slit 72 in the second friction plate 7A. The second friction plate 7A rocks around the shaft section 741 of the bolt 74 as the rocking center. The long slit 72 is formed lengthwise in the direction of tilt positioning. The long slit 72 absorbs a difference between a rocking trajectory formed by the second friction plate 7A and a linear trajectory formed by the outer column 11. The second friction plate 7A smoothly rocks. The outer column 11 can be smoothly adjusted in the telescopic direction.

Third Embodiment

Figure 10:
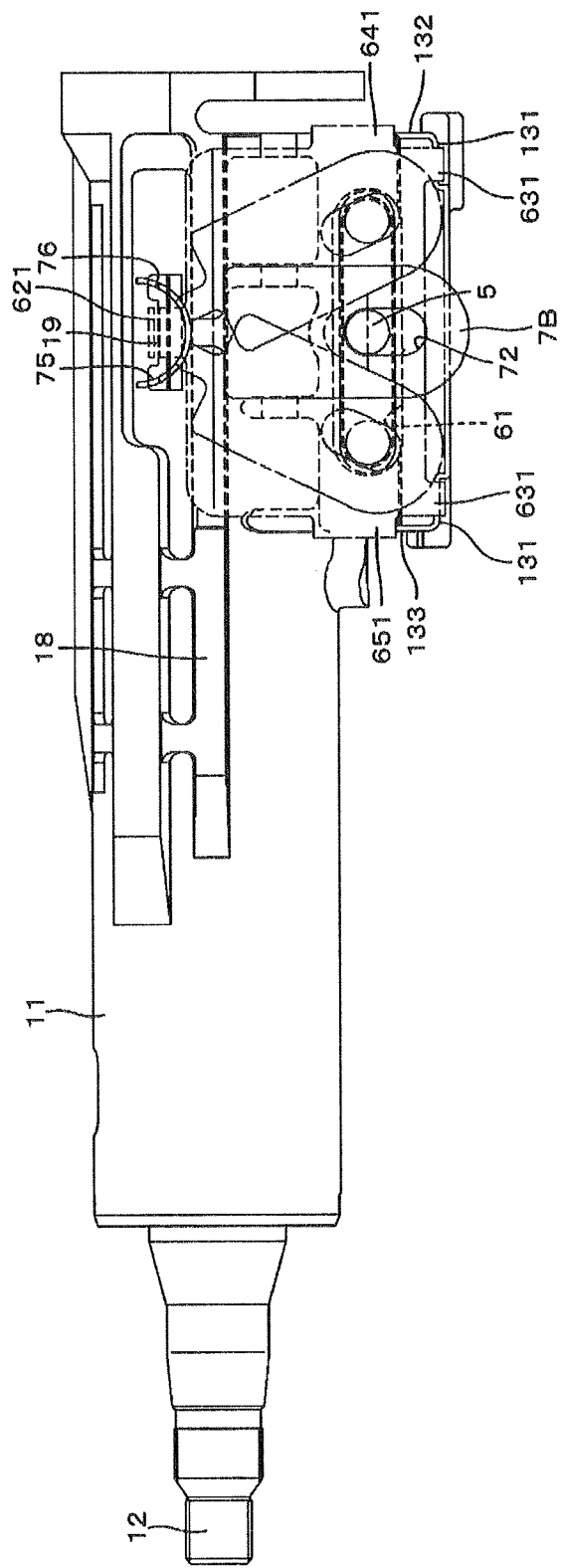
FIG. 10 is a side view of a column for a steering device according to a third embodiment of the invention and is equivalent to FIG. 3 for the first embodiment.
Figure 11:
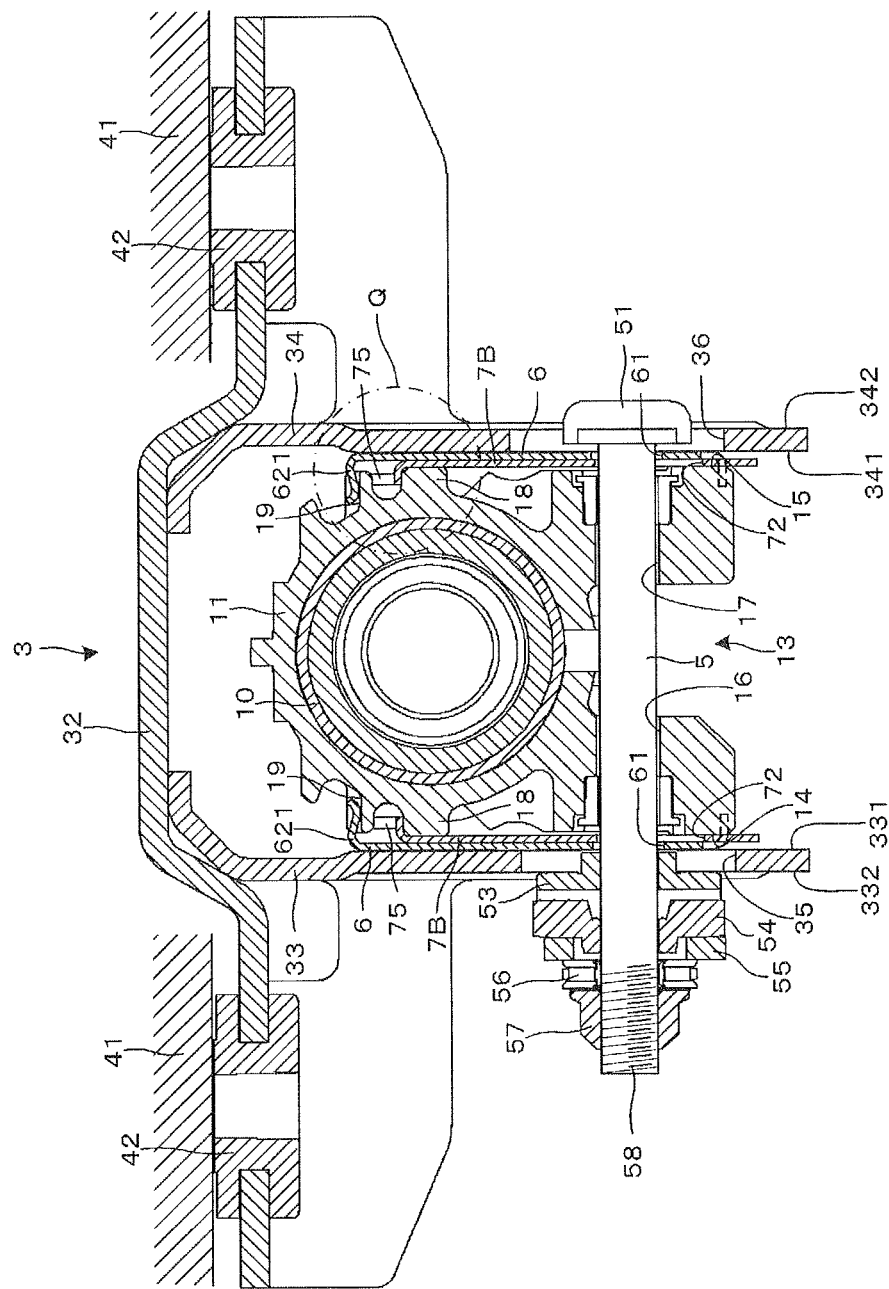
FIG. 11 is a vertical sectional view of a steering device according to the third embodiment of the invention and is equivalent to FIG. 4 for the first embodiment.
Figure 12:
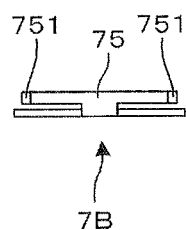
FIG. 12 is a parts diagram of a second friction plate alone according to the third embodiment of the invention, wherein FIG. 12 (a) is a front view of the second friction plate, FIG. 12 (b) is a sectional view taken along the line C-C in FIG. 12 (a), and FIG. 12 (c) is a plan view of FIG. 12 (a)
Figure 12:
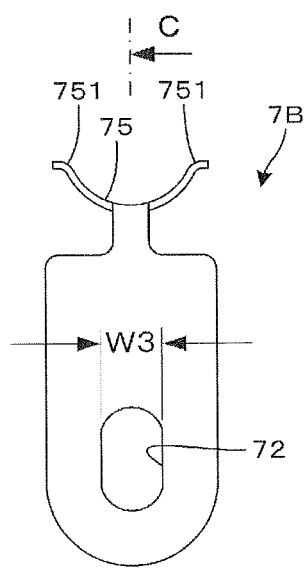
Figure 12:
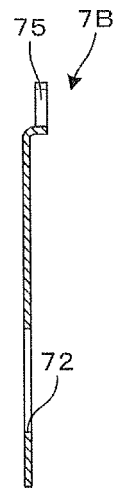
Figure 13:
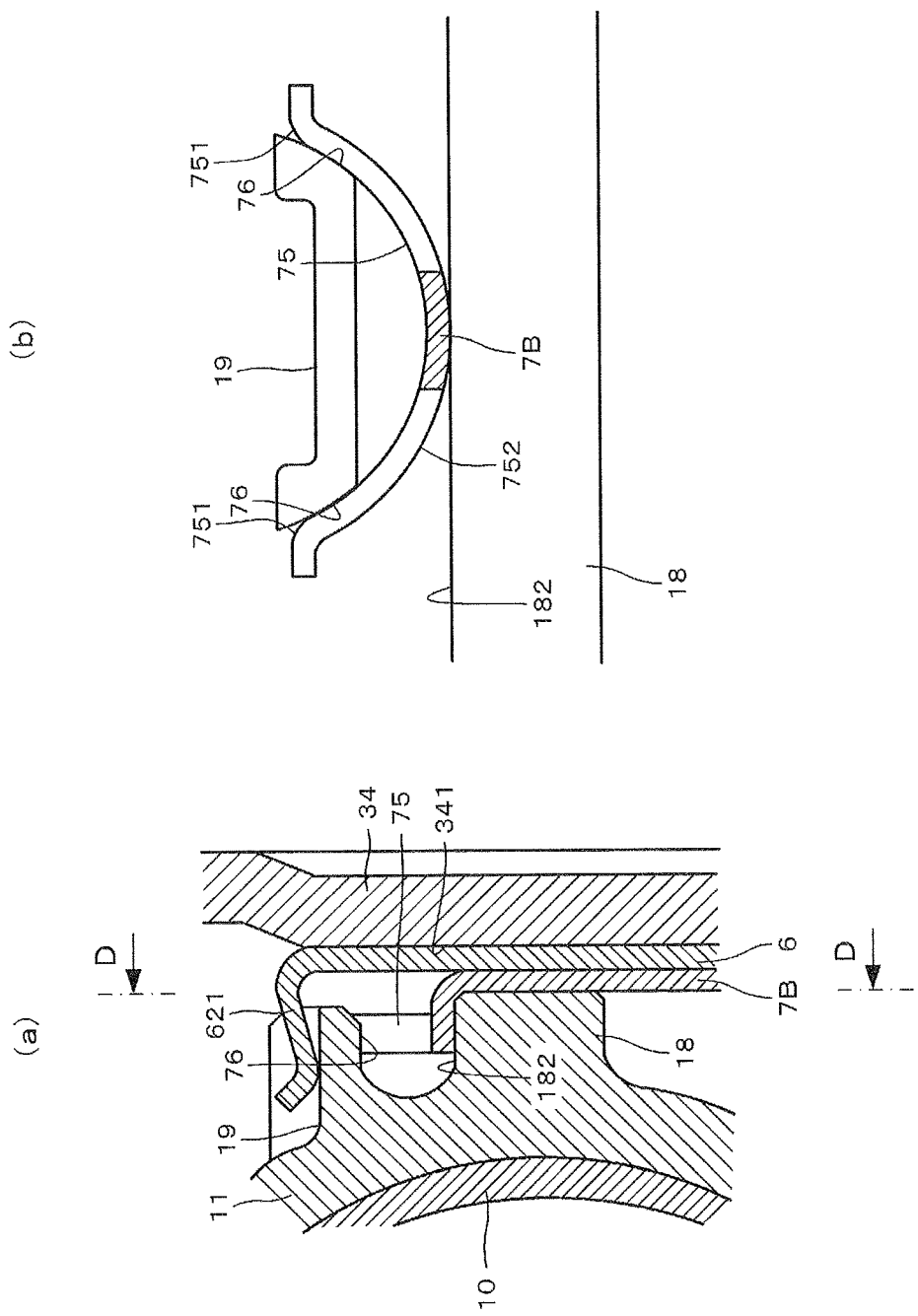
FIG. 13 (a) is an enlarged sectional view of portion Q in FIG. 11 and FIG. 13 (b) is a sectional view taken along the line D-D in FIG. 13 (a)

The third embodiment of the invention will be described. FIG. 10 is a side view of a column for a steering device according to the third embodiment of the invention and is equivalent to FIG. 3 for the first embodiment. FIG. 11 is a vertical sectional view of a steering device according to the third embodiment of the invention and is equivalent to FIG. 4 for the first embodiment. FIG. 12 is a parts diagram of a second friction plate alone according to the third embodiment of the invention. FIG. 12 (*a*) is a front view of the second friction plate. FIG. 12 (*b*) is a sectional view taken along the line C-C in FIG. 12 (*a*). FIG. 12 (*c*) is a plan view of FIG. 12 (*a*). FIG. 13 (*a*) is an enlarged sectional view of portion Q in FIG. 11. FIG. 13 (*b*) is a sectional view taken along the line D-D in FIG. 13 (*a*). The following description contains only differences from the above-mentioned embodiments and omits the duplication. The same parts are depicted by the same reference numerals.

Similarly to the second embodiment, the third embodiment provides an example of modifying the first rocking support section that allows the outer column 11 to rockingly support the second friction plate. As shown in FIG. 12, a second friction plate 7A according to the third embodiment is ovally formed to be lengthwise along the direction of tilt positioning similarly to the first embodiment. The long slit 72 is formed at the bottom along the direction of tilt positioning similarly to the first embodiment. The tightening rod 5 is inserted into the long slit 72. An arcuately recessed surface (recessed toward the vehicle bottom) 75 is formed at the top of the second friction plate 7B according to the third embodiment. The arcuately recessed surface is bent at a right angle farther from the observing point in FIG. 12 (*a*) and then is bent upward arcuately. Round surfaces 751 are formed at both ends of the arcuately recessed surface 75 so as to protrude toward the vehicle top. The long slit 72 is formed lengthwise toward the center of the arcuately recessed surface 75. The long slit 72 has a width W3 with a slight gap for allowing the tightening rod 5 to pass through.

As shown in FIG. 13, an arcuately protruded surface (protruded toward the vehicle bottom) 76 is formed on the side surface near the shaft center of the outer column 11. The arcuately protruded surface 76 has the same curvature radius as that of the arcuately recessed surface 75. The arcuately recessed surface 75 of the second friction plate 7B comes in contact with the arcuately protruded surface 76. The arcuately protruded surface 76 rockingly supports the arcuately recessed surface 75. Accordingly, the outer column 11 rockingly supports the second friction plate 7B around the arcuately protruded surface 76 as the rocking center. Since the round surfaces 751 are formed at both ends of the arcuately recessed surface 75, the second friction plate 7B smoothly rocks by preventing the arcuately recessed surface 75 from being caught by the arcuately protruded surface 76. A top surface 182 of the linear rib 18 supports an arcuate bottom surface 752 of the second friction plate 7B. The arcuately recessed surface 75 and the arcuately protruded surface 76 configure the first rocking support section that allows the outer column 11 to rockingly support the second friction plate 7B.

The first friction plate 6 according to the third embodiment has completely the same structure as that according to the first embodiment and a detailed description is omitted for simplicity. When the first friction plate 6 is pressed against the side surfaces 14 and 15 of the distance bracket 13, the fixing section structured equally to the first embodiment fixes the first friction plate 6 to the outer column 11 in order to disable relative movement. The third embodiment eliminates a bolt for rockingly supporting the second friction plate 7B and is therefore capable of decreasing the number of parts.

When the outer column 11 is displaced in the telescopic direction as shown in FIG. 10, the tightening rod 5 touches the long slit 72 in the second friction plate 7B. The second friction plate 7B rocks around the arcuately protruded surface 76 as the rocking center. The long slit 72 is formed lengthwise in the direction of tilt positioning. The long slit 72 absorbs a difference between a rocking trajectory formed by the second friction plate 7B and a linear trajectory formed by the outer column 11. The second friction plate 7B smoothly rocks. The outer column 11 can be smoothly adjusted in the telescopic direction.

Fourth Embodiment

Figure 14:
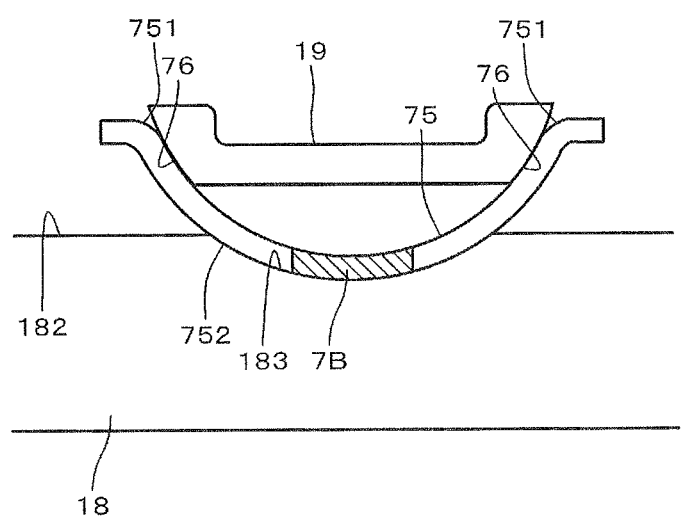
FIG. 14 is a side view of a first rocking support section for a second friction plate of a steering device according to a fourth embodiment of the invention and is equivalent to FIG. 13 (b) for the third embodiment.

The fourth embodiment of the invention will be described. FIG. 14 is a side view of a first rocking support section for a second friction plate of a steering device according to the fourth embodiment of the invention and is equivalent to FIG. 13 (b) for the third embodiment. The following description contains only differences from the above-mentioned embodiments and omits the duplication. The same parts are depicted by the same reference numerals.

Similarly to the third embodiment, the fourth embodiment provides an example of modifying the first rocking support section that allows the outer column 11 to rockingly support the second friction plate. As shown in FIG. 14, the second friction plate 7B of the fourth embodiment is shaped completely equally to that the third embodiment. The arcuately recessed surface (recessed toward the vehicle bottom) 75 the round surfaces 751 are formed toward the top.

Similarly to the third embodiment, the arcuately protruded surface (protruded toward the vehicle bottom) 76 is formed on the side surface near the shaft center of the outer column 11. The arcuately protruded surface 76 has the same curvature radius as that of the arcuately recessed surface 75. The arcuately recessed surface 75 of the second friction plate 7B comes in contact with the arcuately protruded surface 76. The arcuately protruded surface 76 rockingly supports the arcuately recessed surface 75. An arcuately recessed surface 183 is formed on the top surface 182 of the linear rib 18. The arcuately recessed surface 183 has the same curvature radius as that of the arcuate bottom surface 752.

Accordingly, the arcuate bottom surface 752 of the second friction plate 7B comes in contact with the arcuately recessed surface 183. The arcuately recessed surface 183 rockingly supports the arcuate bottom surface 752. The second friction plate 7B is sandwiched between the arcuately protruded surface 76 and the arcuately recessed surface 183. It is possible to prevent the second friction plate 7B from being detached from the outer column 11 while the friction plates are assembled. The arcuately recessed surface 75, the arcuately protruded surface 76, and the arcuately recessed surface 183 configure the first rocking support section that allows the outer column 11 to rockingly support the second friction plate 7B.

Fifth Embodiment

Figure 15:
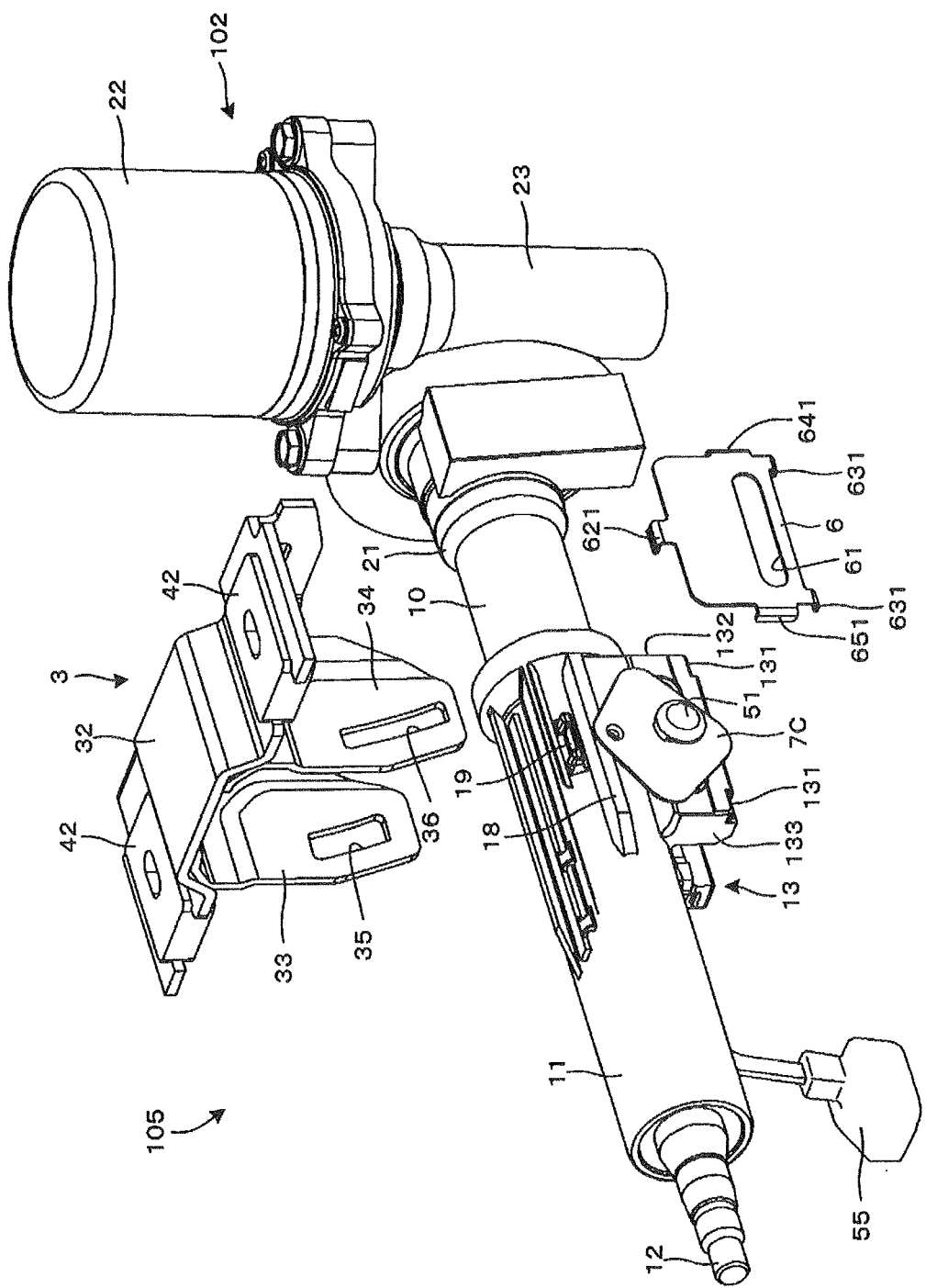
FIG. 15 is an exploded perspective view of a steering device according to a fifth embodiment of the invention viewed from the vehicle body rear and is equivalent to FIG. 2 for the first embodiment.
Figure 16:
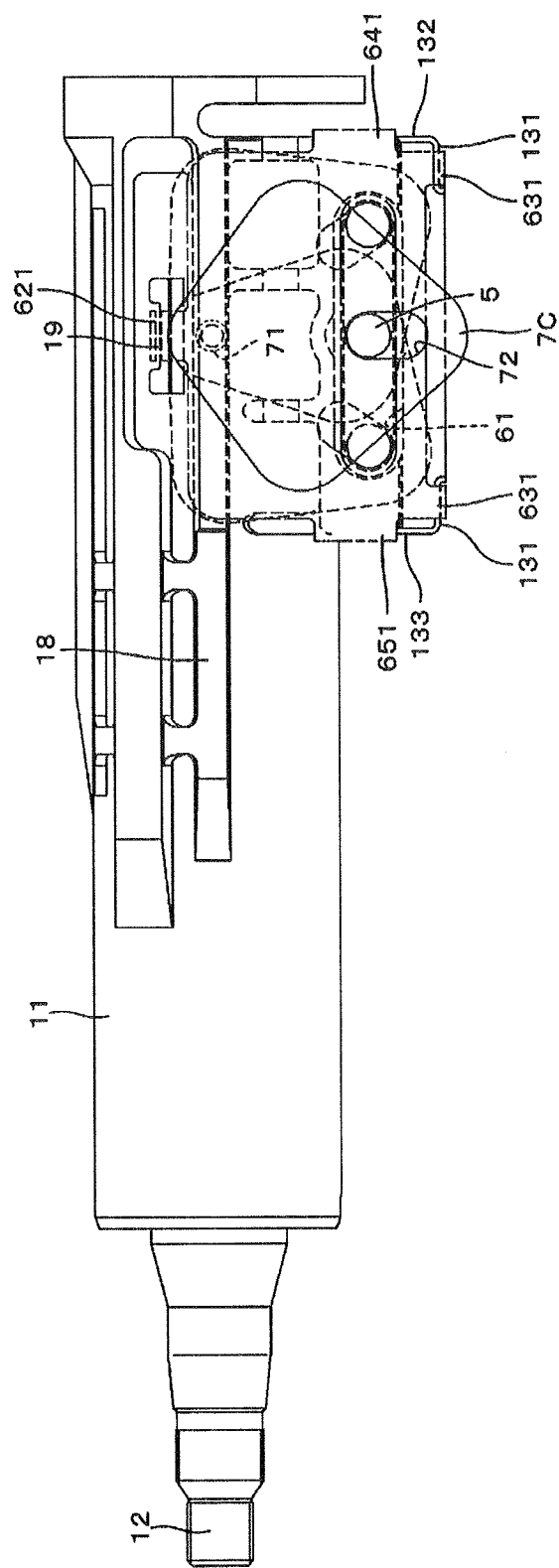
FIG. 16 is a side view of the column in FIG. 15 with the mounting bracket removed and is equivalent to FIG. 3 for the first embodiment.
Figure 17:
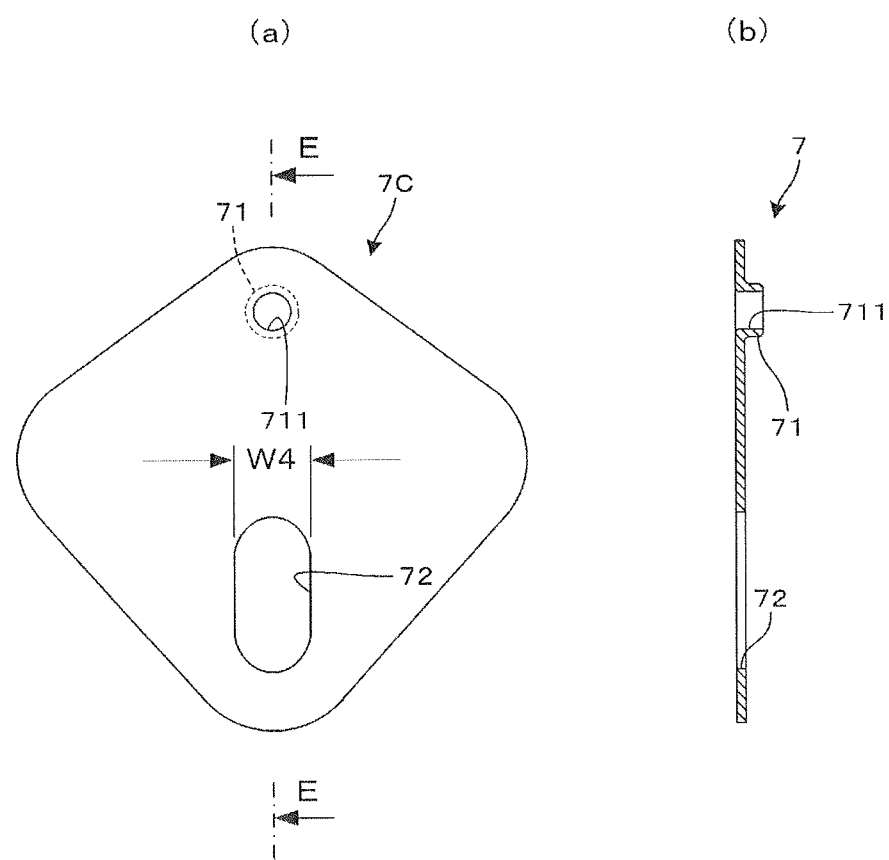
FIG. 17 is a parts diagram of a second friction plate alone according to the fifth embodiment of the invention, wherein FIG. 17 (a) is a front view of the second friction plate and FIG. 17 (b) is a sectional view taken along the line E-E in FIG. 17 (a)

The fifth embodiment of the invention will be described. FIG. 15 is an exploded perspective view of a steering device according to the fifth embodiment of the invention viewed from the vehicle body rear and is equivalent to FIG. 2 for the first embodiment. FIG. 16 is a side view of the column in FIG. 15 with the mounting bracket removed and is equivalent to FIG. 3 for the first embodiment. FIG. 17 is a parts diagram of a second friction plate alone according to the fifth embodiment of the invention. FIG. 17 (a) is a front view of the second friction plate. FIG. 17 (b) is a sectional view taken along the line E-E in FIG. 17 (a). The following description contains only differences from the above-mentioned embodiments and omits the duplication. The same parts are depicted by the same reference numerals.

The fifth embodiment provides an example of increasing the area of the second friction plate to stabilize the clamping force. As shown in FIGS. 15 through 17, the fifth embodiment uses a diamond-shaped second friction plate 7C that is formed lengthwise in the directions of tilt positioning and telescopic positioning. The second friction plate 7C is shaped as a quadrilateral having the diagonals crossing orthogonally to each other and two sets of sides, each set containing two adjacent sides of equal length. The long slit 72 is formed at the bottom along the direction of tilt positioning similarly to the first embodiment. The tightening rod 5 is inserted into the long slit 72. The columnar protrusion 71 is formed integrally with the second friction plate 7C according to the fifth embodiment at its top similarly to the first embodiment. The long slit 72 is formed lengthwise toward the center of the columnar protrusion 71. The long slit 72 has a width W4 with a slight gap for allowing the tightening rod 5 to pass through.

Similarly to the first embodiment, a circular recess (not shown) is formed on the outer curved surface of the outer column 11. The columnar protrusion 71 of the second friction plate 7C is fit into the circular recess. The circular recess rockingly supports the columnar protrusion 71. Accordingly, the outer column 11 rockingly supports the second friction plate 7C at the columnar protrusion 71 as the rocking center.

The first friction plate 6 according to the fifth embodiment has completely the same structure as that according to the first embodiment and a detailed description is omitted for simplicity. When the first friction plate 6 is pressed against the side surfaces 14 and 15 of the distance bracket 13, the fixing section structured equally to the first embodiment fixes the first friction plate 6 to the outer column 11 in order to disable relative movement.

When the operation lever 55 is rotated in the clamping direction, the first friction plate 6 and the second friction plate 7C are used to clamp the distance bracket 13 of the outer column 11 to the mounting bracket 3. A frictional force acts between the first friction plate 6 and the second friction plate 7C and allows the mounting bracket 3 to fasten the outer column 11 in the tilt direction and the telescopic direction. The second friction plate 7C according to the fifth embodiment is formed longer than the equivalent according to the first embodiment in the directions of tilt positioning and telescopic positioning and increases the area in contact with the first friction plate 6. This makes it possible to stabilize the holding force for fastening in the tilt direction and the telescopic direction.

When the outer column 11 is displaced in the telescopic direction as shown in FIG. 16, the first friction plate 6 is also displaced with the outer column 11 in the telescopic direction. The tightening rod 5 touches the long slit 72 in the second friction plate 7C. The second friction plate 7C rocks around the columnar protrusion 71 as the rocking center. The long slit 72 is formed lengthwise in the direction of tilt positioning. The long slit 72 absorbs a difference between a rocking trajectory formed by the second friction plate 7C and a linear trajectory formed by the outer column 11. The second friction plate 7C smoothly rocks. The outer column 11 can be smoothly adjusted in the telescopic direction. While the fifth embodiment has described the example of the diamond-shaped second friction plate 7C, the second friction plate maybe also shaped like a circle or a polygon.

Sixth Embodiment

Figure 18:
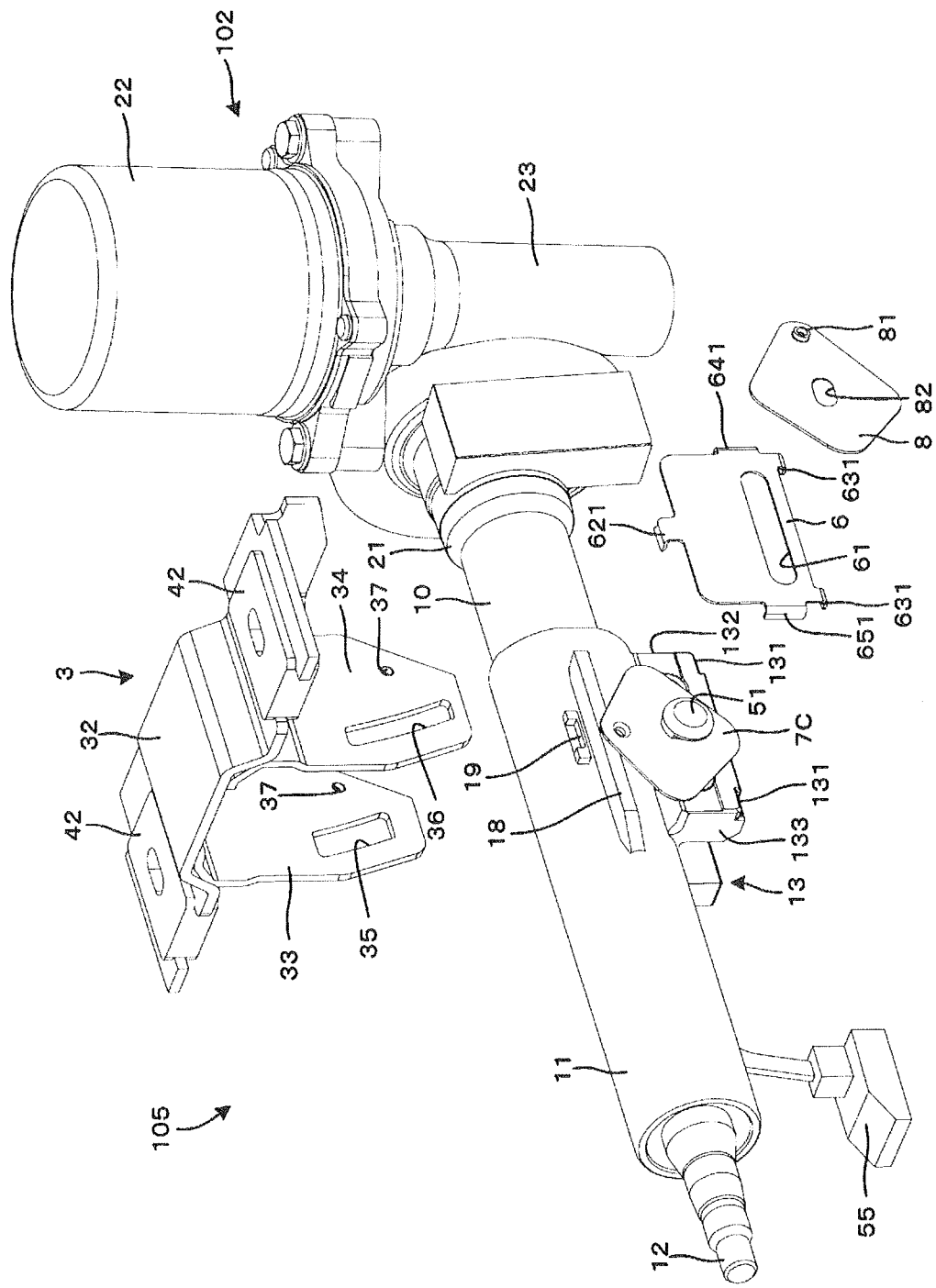
FIG. 18 is an exploded perspective view of a steering device according to a sixth embodiment of the invention viewed from the vehicle body rear and is equivalent to FIG. 2 for the first embodiment.
Figure 19:
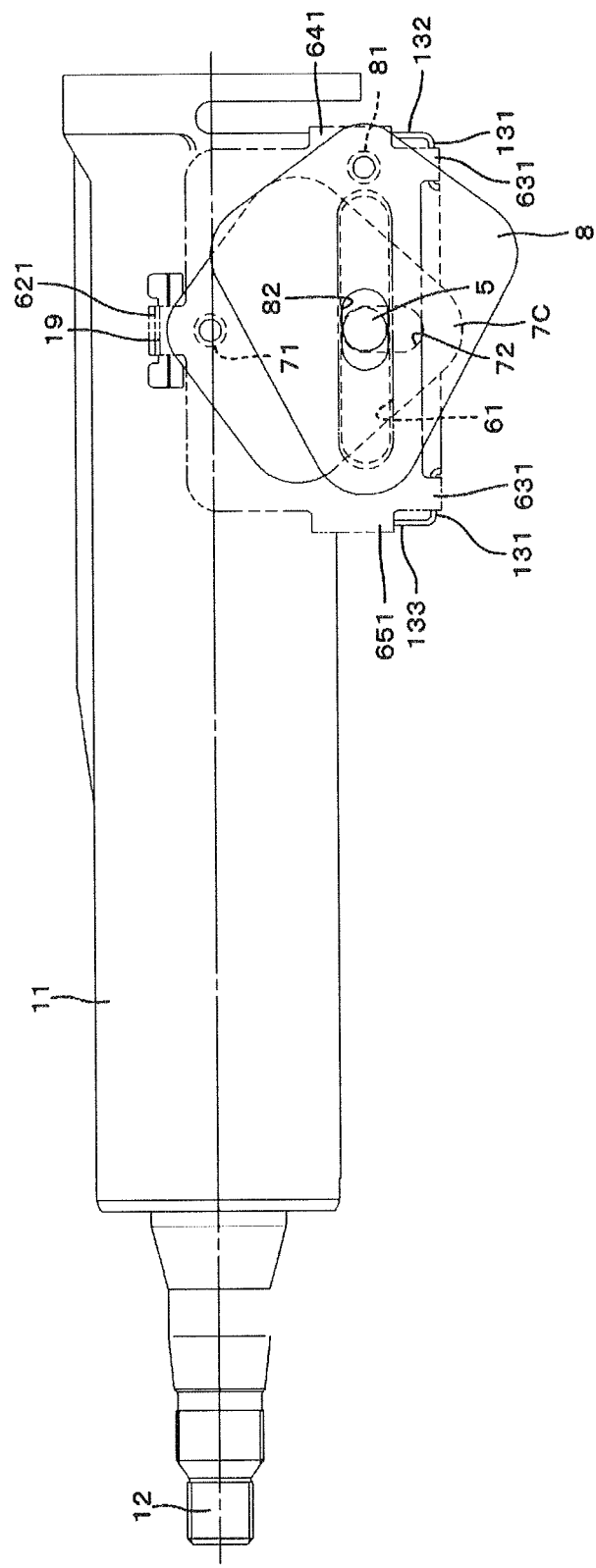
FIG. 19 is a side view of the column in FIG. 18 with the mounting bracket removed and shows an intermediate tilt adjustment position.
Figure 20:
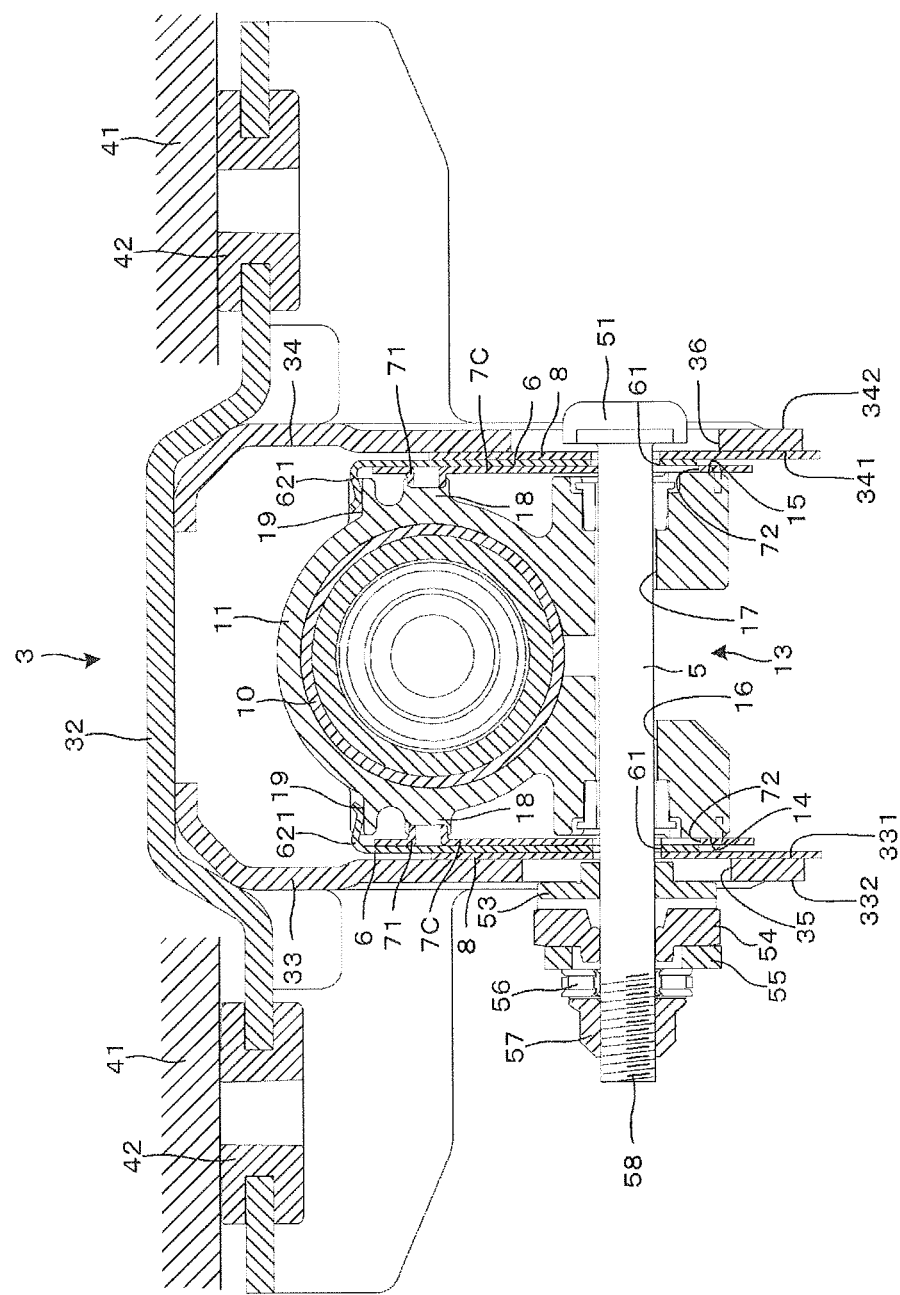
FIG. 20 is a vertical sectional view of FIG. 18 and is equivalent to FIG. 4 for the first embodiment.
Figure 21:
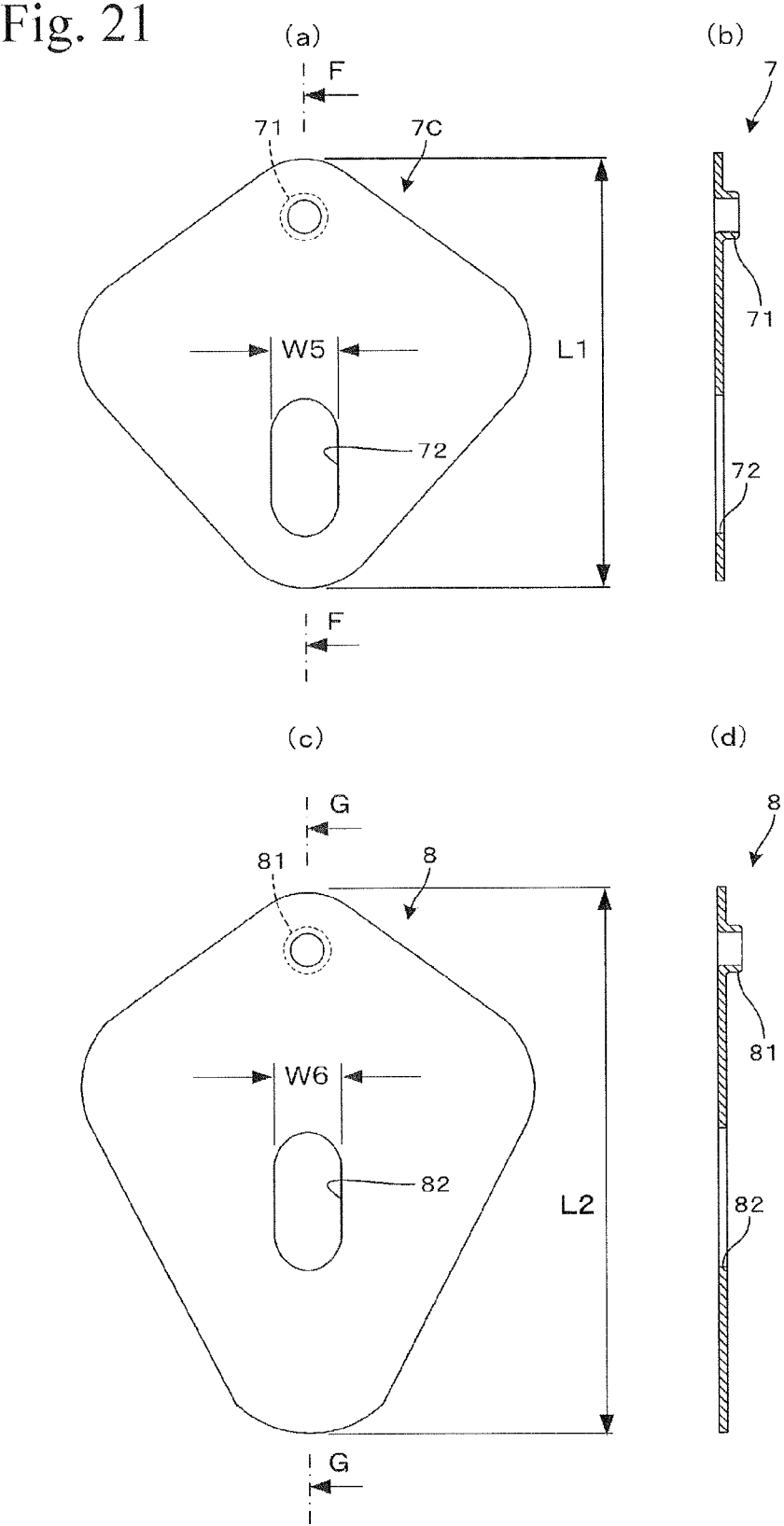
FIG. 21 is a parts diagram of second and third friction plates alone according to the sixth embodiment of the invention, wherein FIG. 21 (a) is a front view of the second friction plate, FIG. 21 (b) is a sectional view taken along the line F-F in FIG. 21 (a), FIG. 21 (c) is a front view of the third friction plate, and FIG. 21 (d) is a sectional view taken along the line G-G in FIG. 21 (c)

The sixth embodiment of the invention will be described. FIG. 18 is an exploded perspective view of a steering device according to the sixth embodiment of the invention viewed from the vehicle body rear and is equivalent to FIG. 2 for the first embodiment. FIG. 19 is a side view of the column in FIG. 18 with the mounting bracket removed and shows an intermediate tilt adjustment position. FIG. 20 is a vertical sectional view of FIG. 18 and is equivalent to FIG. 4 for the first embodiment. FIG. 21 is a parts diagram of second and third friction plates alone according to the sixth embodiment of the invention. FIG. 21 (a) is a front view of the second friction plate. FIG. 21 (b) is a sectional view taken along the line F-F in FIG. 21 (a). FIG. 21 (c) is a front view of the third friction plate. FIG. 21 (d) is a sectional view taken along the line G-G in FIG. 21 (c).

Figure 22:
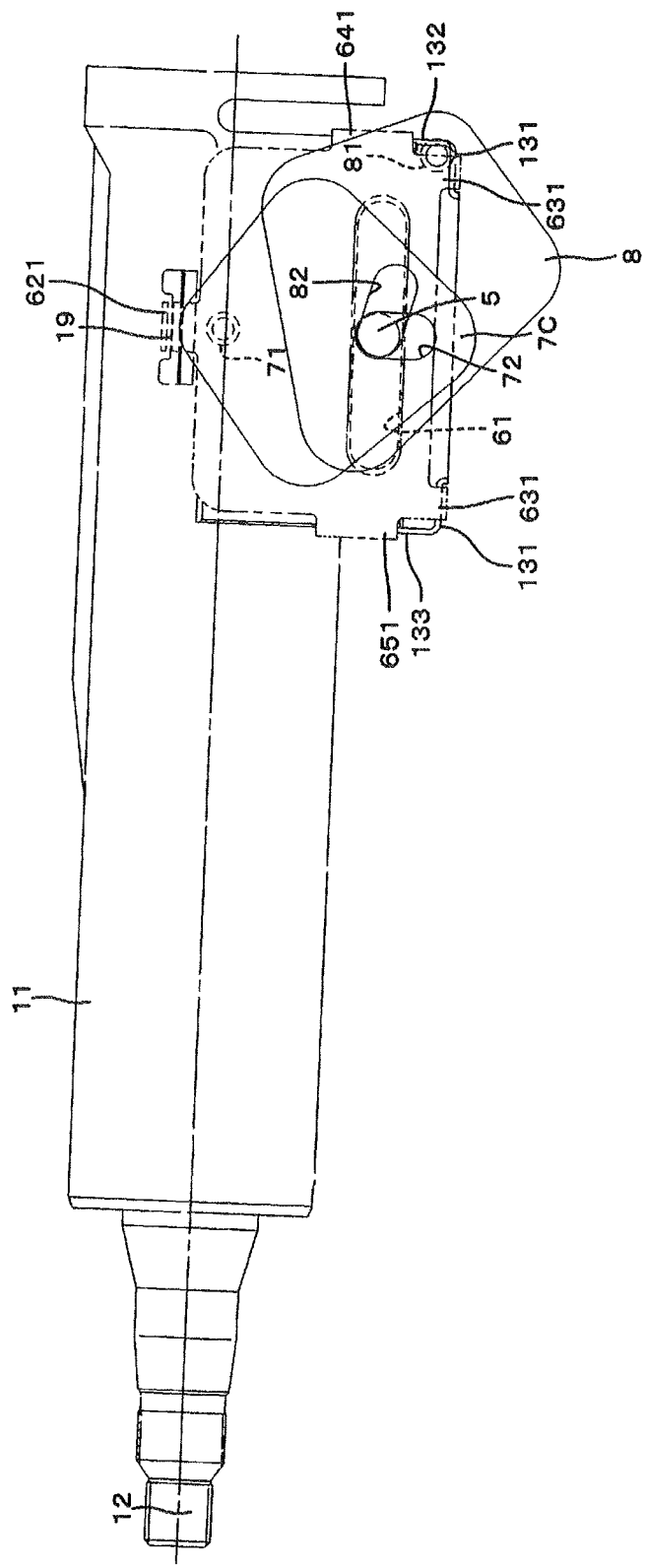
FIG. 22 is a side view of a column according to the sixth embodiment of the invention, indicating a tilt adjustment position set to the top end of a vehicle.
Figure 23:
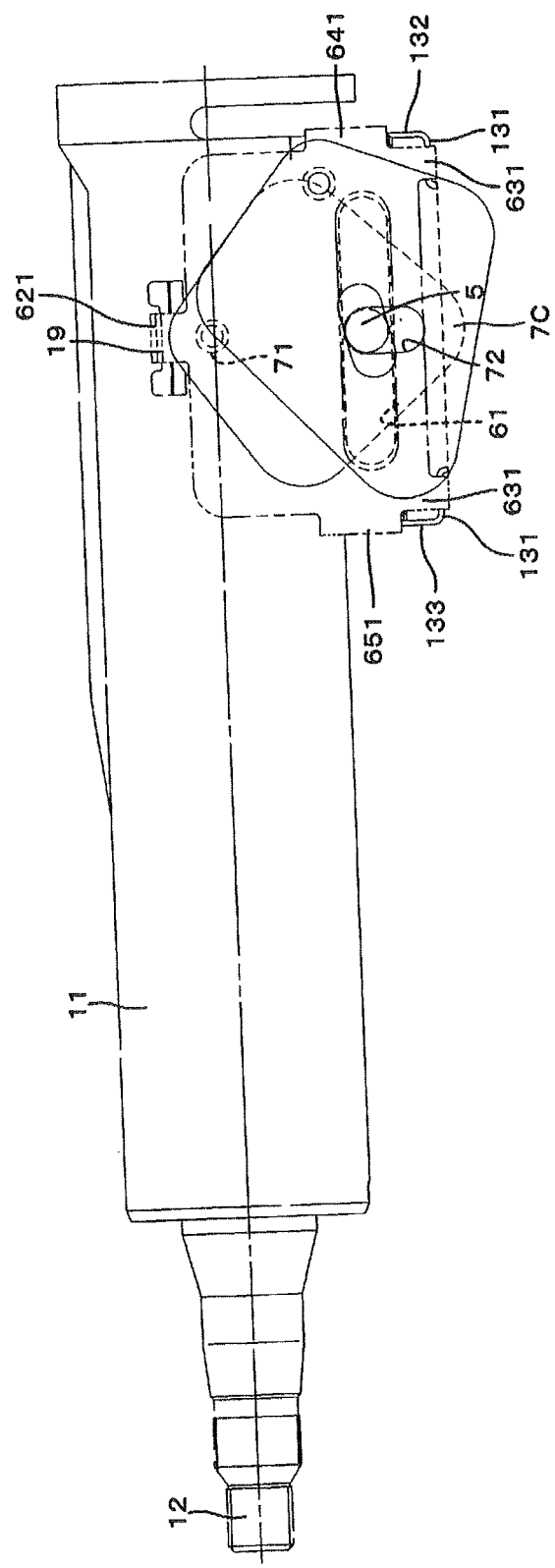
FIG. 23 is a side view of a column according to the sixth embodiment of the invention, indicating a tilt adjustment position set to the bottom end of a vehicle.

FIG. 22 is a side view of a column according to the sixth embodiment of the invention, indicating a tilt adjustment position set to the top end of a vehicle. FIG. 23 is a side view of a column according to the sixth embodiment of the invention, indicating a tilt adjustment position set to the bottom end of a vehicle. The following description contains only differences from the above-mentioned embodiments and omits the duplication. The same parts are depicted by the same reference numerals.

The sixth embodiment provides an example of using a large-area second friction plate and a third friction plate to stabilize the clamping force and generate large clamping force. As shown in FIGS. 18 through 23, the first friction plate 6, the second friction plate 7C, and a third friction plate 8 are layered and are sandwiched between the inner surface 331 of the side plate 33 for the mounting bracket 3 and the side surface 14 of the distance bracket 13 and between the inner surface 341 of the side plate 34 for the mounting bracket 3 and the side surface 15 of the distance bracket 13.

The second friction plates 7C are placed in contact with the side surfaces 14 and 15 of the distance bracket 13. The first friction plates 6 hold the second friction plates 7 from the outside along the vehicle width direction. The third friction plates 8 hold the first friction plates 6 from the outside along the vehicle width direction and are placed in contact with the inner surfaces 331 and 341 of the side plates 33 and 34.

The second friction plate 7C of the sixth embodiment is diamond-shaped equally to that of the fifth embodiment. As shown in FIGS. 21 (a) and 21 (b), the long slit 72 is formed at the bottom along the direction of tilt positioning similarly to the fifth embodiment. The tightening rod 5 is inserted into the long slit 72. The columnar protrusion 71 is formed integrally with the second friction plate 7C according to the sixth embodiment at its top similarly to the fifth embodiment. The long slit 72 is formed lengthwise toward the center of the columnar protrusion 71. The long slit 72 has a width W5 with a slight gap for allowing the tightening rod 5 to pass through.

Similarly to the fifth embodiment, a circular recess (not shown) is formed on the outer curved surface of the outer column 11. The columnar protrusion 71 of the second friction plate 7C is fit into the circular recess. The circular recess rockingly supports the columnar protrusion 71. Accordingly, the outer column 11 rockingly supports the second friction plate 7C at the columnar protrusion 71 as the rocking center.

The first friction plate 6 according to the sixth embodiment has completely the same structure as that according to the first embodiment and a detailed description is omitted for simplicity. When the first friction plate 6 is pressed against the side surfaces 14 and 15 of the distance bracket 13, the fixing section structured equally to the first embodiment fixes the first friction plate 6 to the outer column 11 in order to disable relative movement.

As shown in FIGS. 21 (c) and 21 (d), the sixth embodiment uses a diamond-shaped third friction plate 8 that is formed lengthwise in the directions of tilt positioning and telescopic positioning. The third friction plate 8 is shaped as a quadrilateral having the diagonals crossing orthogonally to each other and two sets of sides, each set containing two adjacent sides of equal length. A long slit 82 is formed at the bottom of the third friction plate 8 lengthwise in the vertical direction in FIG. 21. The tightening rod 5 is inserted into the long slit 82. A columnar protrusion 81 is formed integrally at the top of the third friction plate 8. The long slit 82 is formed lengthwise toward the center of the columnar protrusion 81. The long slit 82 has a width W6 with a slight gap for allowing the tightening rod 5 to pass through. A length L2 corresponds to a vertical diagonal in FIG. 21 (c) that divides the third friction plate 8 into two equal parts. A length L1 corresponds to a vertical diagonal in FIG. 21 (a) that divides the second friction plate 7C into two equal parts. The length L2 is greater than the length L1.

Circular through-holes 37 are formed in the side plates 33 and 34 for the mounting bracket 3. The columnar protrusions 81 of the third friction plates 8 are fit into the circular through-holes 37. The columnar protrusions 81 are rockingly supported in the circular through-holes 37. The side plates 33 and 34 rockingly support the third friction plates 8 around the columnar protrusions 81 as the rocking center. The columnar protrusions 81 and the circular through-holes 37 configure a second rocking support section that allows the side plates 33 and 34 to rockingly support the third friction plates 8. According to the sixth embodiment, the circular through-holes 37 are formed toward the vehicle body front from the telescopic adjustment long slits 35 and 36. Alternatively, the circular through-holes 37 may be formed toward the vehicle body rear from the telescopic adjustment long slits 35 and 36.

When the operation lever 55 is rotated in the clamping direction, the first friction plate 6, the second friction plate 7C, and the third friction plate 8 are used to fasten the distance bracket 13 of the outer column 11 to the mounting bracket 3. A frictional force acts between the first friction plate 6, the second friction plate 7C, and the third friction plate 8 and allows the outer column 11 to fasten onto the mounting bracket 3 in the tilt and telescopic directions. In addition to the effect of the fifth embodiment, the sixth embodiment can increase the contact area between third friction plates 8 and the side plates 33 and 34 regardless of adjustment positions in the tilt direction. It is possible to increase the holding force in the tilt direction.

When the outer column 11 tilts as shown in FIGS. 22 and 23, the first friction plate 6 and the second friction plate 7C is also displaced with the outer column 11 in the tilt direction. Since the tightening rod 5 touches the long slit 82 of the third friction plate 8, the third friction plate 8 rocks around the columnar protrusion 81 as the rocking center. The long slit 82 is formed lengthwise in the direction of telescopic positioning. The long slit 82 absorbs a difference between a rocking trajectory formed by the third friction plate 8 and a linear trajectory formed by the outer column 11. The second friction plate 7C smoothly rocks and makes it possible to smoothly adjust the outer column 11 in the tilt direction.

When the outer column 11 is displaced telescopically, the first friction plate 6 is also displaced with the outer column 11 in the telescopic direction. The third friction plate 8 is not displaced because it is supported by the columnar protrusions 81 inserted into the circular through-holes 37 in the side plates 33 and 34. Since the tightening rod 5 touches the long slit 72 in the second friction plate 7C, the second friction plate 7C rocks around the columnar protrusion 71 as the rocking center.

The long slit 72 is formed lengthwise in the direction of tilt positioning. The long slit 72 absorbs a difference between a rocking trajectory formed by the second friction plate 7C and a linear trajectory formed by the outer column 11. The second friction plate 7C smoothly rocks. The outer column 11 can be smoothly adjusted in the telescopic direction. While the sixth embodiment has described the example of the second friction plate 7C and the third friction plate 8 both diamond-shaped, these friction plates may be also shaped like a circle or a polygon.

Seventh Embodiment

Figure 24:
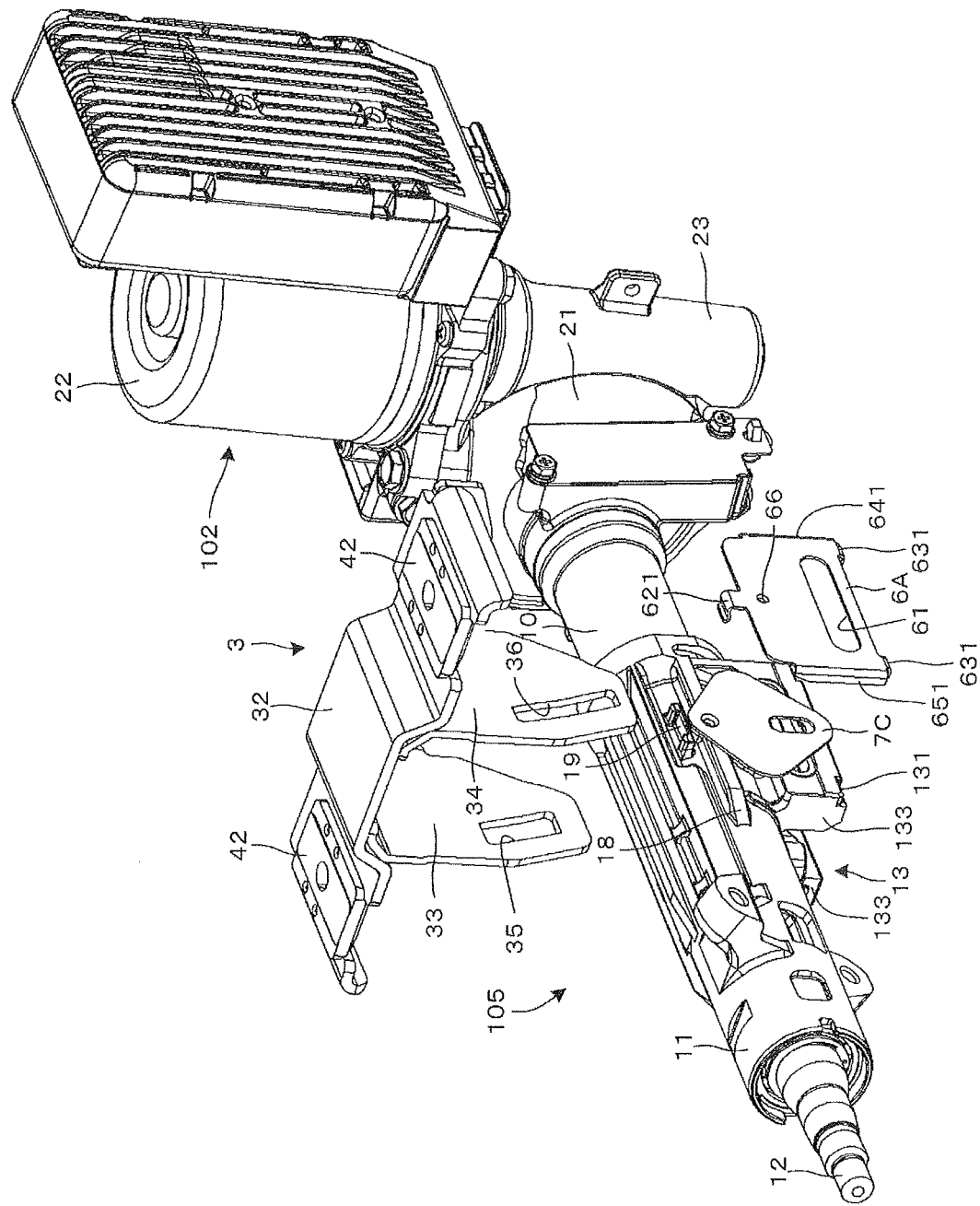
FIG. 24 is an exploded perspective view of a steering device according to a seventh embodiment of the invention viewed from the vehicle body rear.
Figure 25:
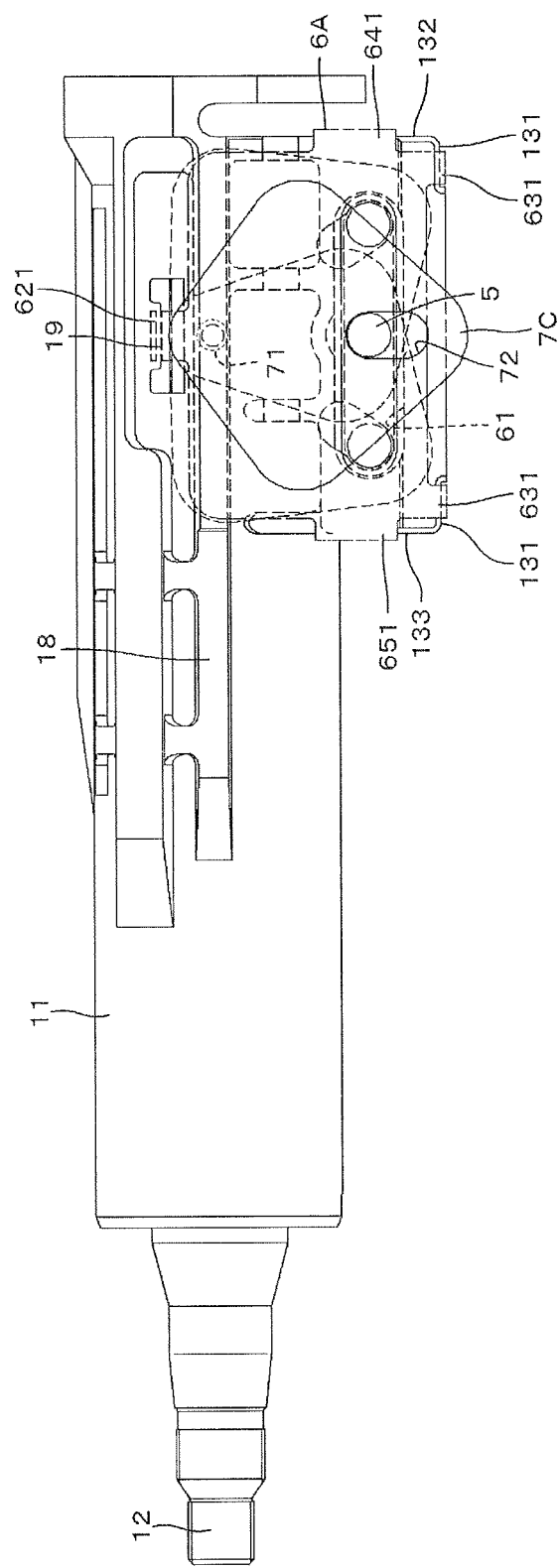
FIG. 25 is a side view of the column in FIG. 24 with the mounting bracket removed.
Figure 26:
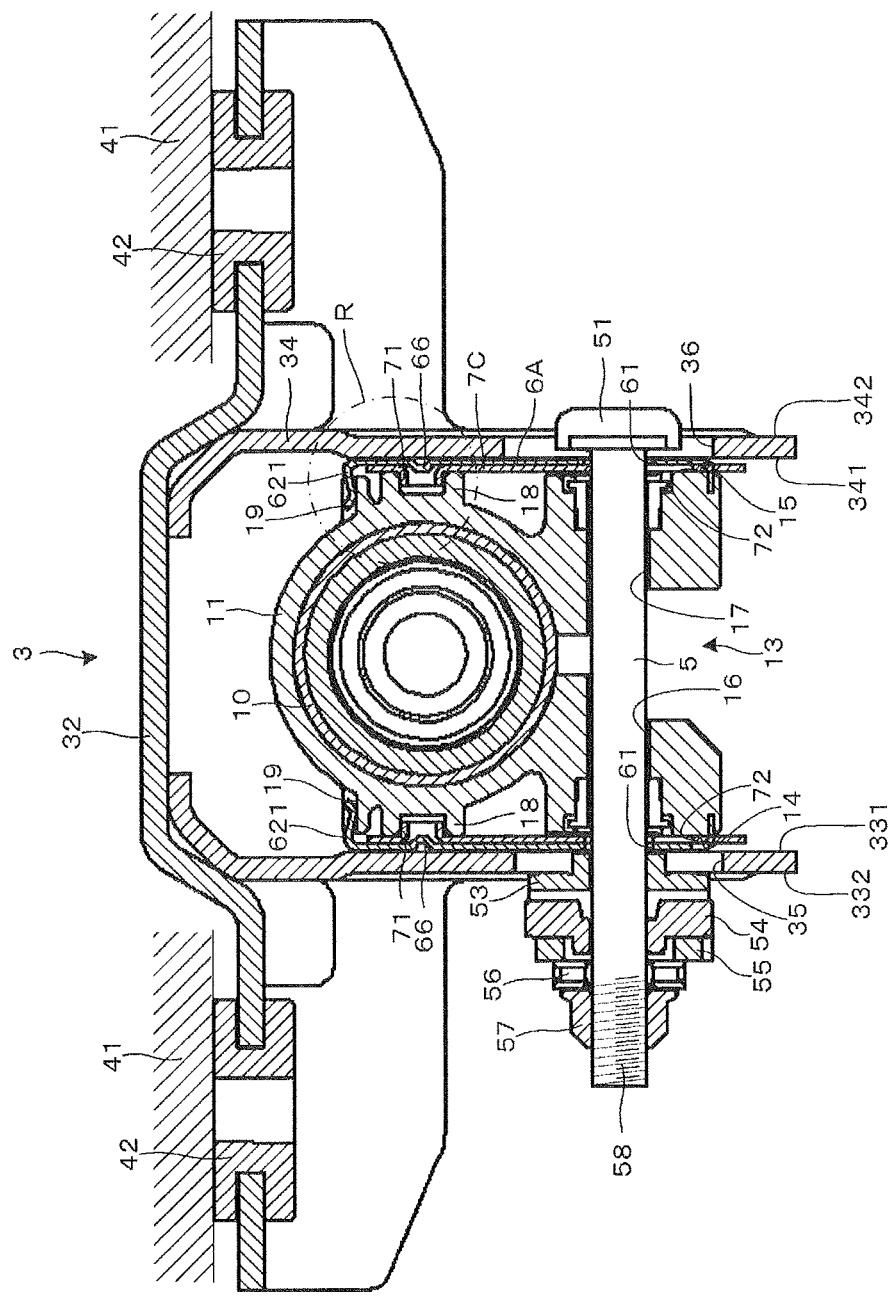
FIG. 26 is a vertical sectional view of FIG. 24.
Figure 27:
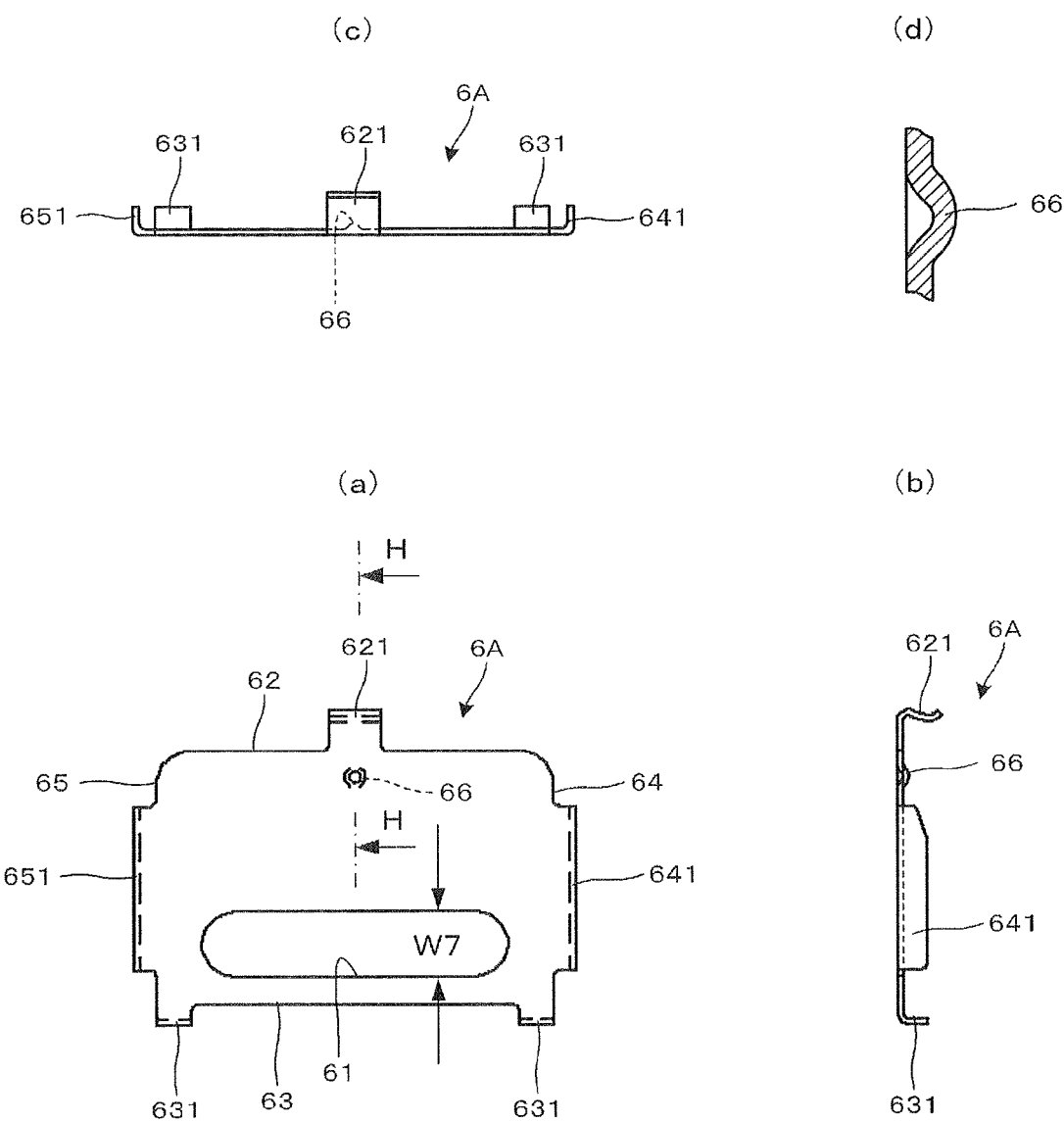
FIG. 27 is a parts diagram of a first friction plate alone according to the seventh embodiment of the invention, wherein FIG. 27 (a) is a front view of the first friction plate, FIG. 27 (b) is a right side view of FIG. 27 (a), FIG. 27 (c) is a plan view of FIG. 27 (a), and FIG. 27 (d) is a sectional view taken along the line H-H in FIG. 27 (a)
Figure 28:
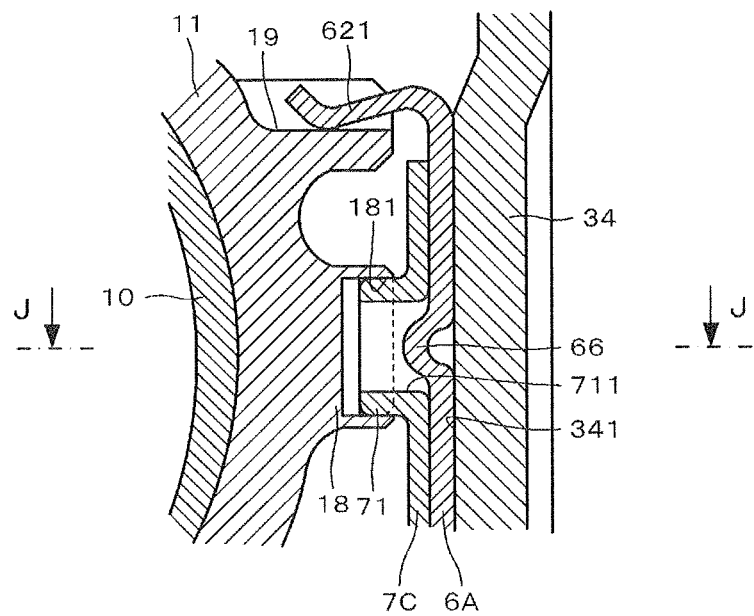
FIG. 28 is an enlarged sectional view of a first rocking support section according to the seventh embodiment of the invention and is equivalent to FIG. 7 (a) for the first embodiment.

The seventh embodiment of the invention will be described. FIG. 24 is an exploded perspective view of a steering device according to the seventh embodiment of the invention viewed from the vehicle body rear. FIG. 25 is a side view of the column in FIG. 24 with the mounting bracket removed. FIG. 26 is a vertical sectional view of FIG. 24. FIG. 27 is a parts diagram of a first friction plate alone according to the seventh embodiment of the invention. FIG. 27 (a) is a front view of the first friction plate. FIG. 27 (b) is a right side view of FIG. 27 (a). FIG. 27 (c) is a plan view of FIG. 27 (a). FIG. 27 (d) is a sectional view taken along the line H-H in FIG. 27 (a). FIG. 28 is an enlarged sectional view of a first rocking support section according to the seventh embodiment of the invention and is equivalent to FIG. 7 (a) for the first embodiment.

Figure 29:
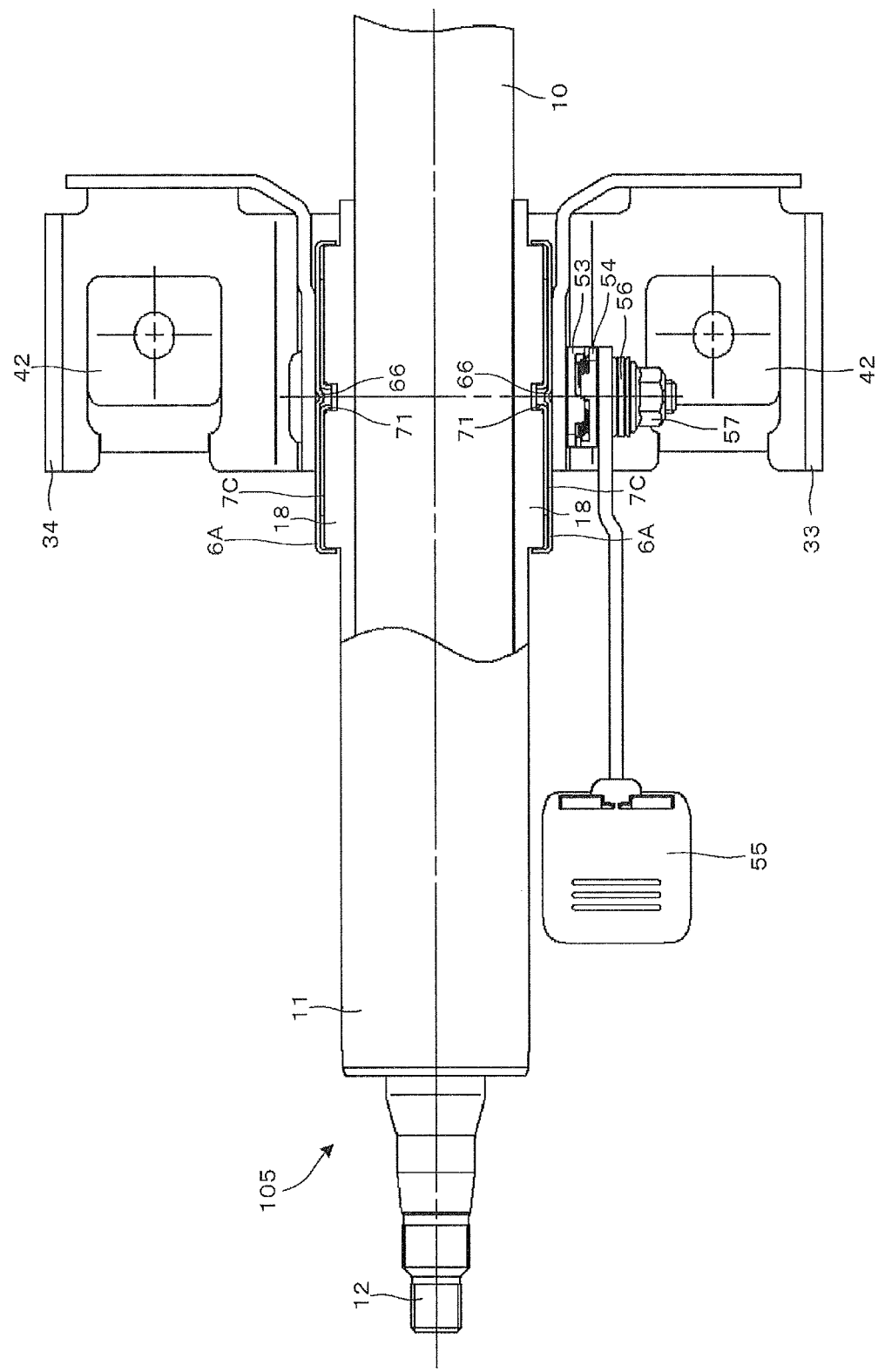
FIG. 29 is a bottom view of a steering device according to the seventh embodiment of the invention viewed from the bottom of a vehicle.
Figure 30:
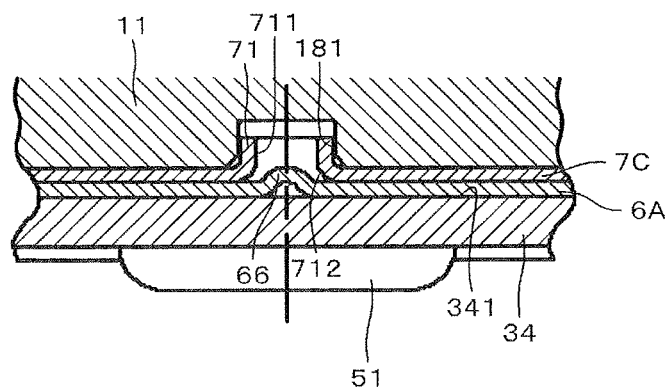
FIG. 30 is a sectional view taken along the line J-J in FIG. 28, wherein FIG. 30 (a) shows a normal driving state, and FIG. 30 (b) shows a state in which a driver bumps against a steering wheel as the second collision and the outer column collapses and moves to the vehicle body front.
Figure 30:
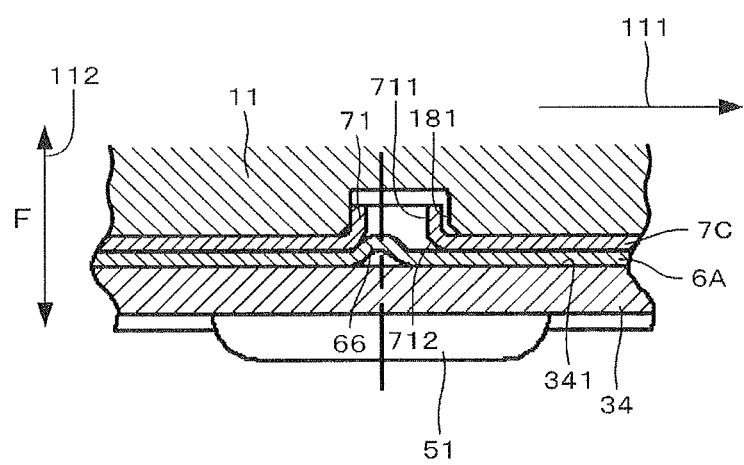

FIG. 29 is a bottom view of a steering device according to the seventh embodiment of the invention viewed from the bottom of a vehicle. FIG. 30 is a sectional view taken along the line J-J in FIG. 28. FIG. 30 (a) shows a normal driving state. FIG. 30 (b) shows a state in which a driver bumps against a steering wheel as the second collision and the outer column collapses and moves to the vehicle body front. The following description contains only differences from the above-mentioned embodiments and omits the duplication. The same parts are depicted by the same reference numerals.

The seventh embodiment is a modification of the fifth embodiment and increases the area of the second friction plate to stabilize the clamping force. Further, the seventh embodiment provides an example of preventing the first friction plate from moving in relation to the outer column 11 and the mounting bracket 3 in case of the second collision. As shown in FIGS. 24 through 30, the second friction plate 7C of the seventh embodiment is also diamond-shaped equally to that of the fifth embodiment. The columnar protrusion 71 of the second friction plate 7C is fit into a circular recess 181 (see FIG. 28) in the outer column 11. The circular recess 181 rockingly supports the columnar protrusion 71. Accordingly, the outer column 11 rockingly supports the second friction plate 7C at the columnar protrusion 71 as the rocking center.

As shown in FIG. 27, a first friction plate 6A according to the seventh embodiment has basically the same structure as that of the first friction plate 6 according to the first embodiment. The first friction plate 6A is formed to contain the telescopic adjustment long slit 61, the top side 62, the bottom side 63, the right side 64, the left side 65, and the bent portions 621, 631 (two positions), 641, and 651. The telescopic adjustment long slit 61 has a width W7 with a slight gap for allowing the tightening rod 5 to pass through. A hemispherical protrusion (protrusion) 66 is formed on the first friction plate 6A according to the seventh embodiment at the center of the direction for telescopic positioning. The hemispherical protrusion 66 is hemispherically protruded farther from the observing point as viewed in FIG. 27 (a).

When the first friction plate 6A is pressed against the side surfaces 14 and 15 of the distance bracket 13, the fixing section structured equally to the first embodiment fixes the first friction plate 6A to the outer column 11 in order to disable relative movement. As shown in FIGS. 28 and 30 (a), a hemispherical protrusion 66 of the first friction plate 6A is inserted into a cylindrical hole 711 (see FIG. 17) formed in the columnar protrusion 71 of the second friction plate 7C.

When the operation lever 55 is rotated in the clamping direction, the first friction plate 6A and the second friction plate 7C are used to clamp the distance bracket 13 of the outer column 11 to the mounting bracket 3. A frictional force acts between the first friction plate 6A and the second friction plate 7C and allows the mounting bracket 3 to fasten the outer column 11 in the tilt direction and the telescopic direction.

When the outer column 11 is displaced telescopically as shown in FIG. 25, the first friction plate 6A is also displaced with the outer column 11 in the telescopic direction. Since the tightening rod 5 touches the long slit 72 in the second friction plate 7C, the second friction plate 7C rocks around the columnar protrusion 71 and the hemispherical protrusion 66 as the rocking center. The long slit 72 is formed lengthwise in the direction of tilt positioning. The long slit 72 absorbs a difference between a rocking trajectory formed by the second friction plate 7C and a linear trajectory formed by the outer column 11. The second friction plate 7C smoothly rocks. The outer column 11 can be smoothly adjusted in the telescopic direction.

When the vehicle collides and the driver bumps against the steering wheel 101 as the second collision, the outer column 11 collapses toward the vehicle body front as indicated by an arrow 111 in FIG. 30 (b). While the first friction plate 6A stays on the side plates 33 and 34, the second friction plate 7C may collapse together with the outer column 11 toward the vehicle body front against the frictional force between the first friction plate 6A and the second friction plate 7C.

A round chamfer 712 is formed at the entry of the cylindrical hole 711 in the second friction plate 7C and is driven on the hemispherical protrusion 66. A large pressing force F is generated in the direction of an arrow 112 in FIG. 30 (b) and acts on the inner surface 341 of the side plate 34, the inner surface 331 of the side plate 33, the first friction plate 6A, the second friction plate 7C, and the side surfaces of 14 and 15 of the distance bracket 13. Consequently, the distance bracket 13 for the outer column 11 is tightly fastened to the mounting bracket 3. The outer column 11 and the distance bracket 13 integrally disengage from the capsules 42 with specified engaging force. The impact force applied to the driver can be decreased.

While the embodiments of the invention have described the example of using one first friction plate, one second friction plate, and one third friction plate, all or part of these friction plates may be provided plurally. While the embodiments have described the example of providing the first friction plate, the second friction plate, and the third friction plate on both sides of the outer column 11 in the vehicle width direction, the friction plates may be provided on one side of the outer column 11 in the vehicle width direction. While the embodiments have described the example of providing the first friction plate and the second friction plate on the outer column 11, the first friction plate and the second friction plate may be provided on the side plate of the mounting bracket. While the embodiments have described the example of applying the invention to the steering device having the steering assist section (electric assist mechanism) 102, the invention may be applied to a steering device having no steering assist section.

DESCRIPTION OF REFERENCE NUMERALS

101—Steering wheel
102—Steering assist section (electric assist mechanism)
103—Steering gear
104—Tie rod
105—Column
106—Intermediate shaft
10—Inner column
11—Outer column
111—Collapsing direction
112—Direction in which the pressing force F acts
12—Steering shaft
13—Distance bracket
131—Rectangular recess
132—Front surface
133—Rear surface
14、15—Side surface
16、17—Telescopic adjustment long slit
18—Linear rib
181—Circular recess
182—Top surface
183—Arcuately recessed surface
19—Rectangular recess
21—Housing
22—Electric motor
23—Speed reducing gearbox
3—Mounting bracket
32—Upper plate
33、34—Side plate
331、341—Inner surface
332、342—Lateral surface
35、36—Tilt adjustment long slit
37—Circular through-hole
41—Vehicle body
42—Capsule
5—Tightening rod
51—Head section
53—Stationary cam
54—Movable cam
55—Operation lever
56—Thrust bearing
57—Nut
58—Male screw
6—First friction plate
6A—First friction plate
61—Telescopic adjustment long slit
62—Top side
621—Bent portion
63—Bottom side
631—Bent portion
64—Right side
641—Bent portion
65—Left side
651—Bent portion
66—Hemispherical protrusion (protrusion)
7—Second friction plate
7A—Second friction plate
7B—Second friction plate
7C—Second friction plate
71—Columnar protrusion
711—Cylindrical hole
712—Round chamfer
72—Long slit
73—Bolt hole
74—Bolt
741—Shaft section
75—Arcuately recessed surface
751—Round surface
752—Arcuate bottom surface
76—Arcuately protruded surface
8—Third friction plate
81—Columnar protrusion
82—Long slit

The invention claimed is:

1. A steering device comprising:
a mounting bracket attachable to a vehicle body;
a column that is supported by the mounting bracket so as to be capable of adjusting a telescopic position and rotatably supports a steering shaft mounted with a steering wheel;
a first friction plate that is formed lengthwise in a direction of the telescopic position adjustment and is fixed to the column by a fixing section in order to disable relative movement;
a second friction plate that overlaps with the first friction plate and is rockingly supported by a first rocking support section on the column;
a tightening rod that clamps the column onto the mounting bracket at a specified telescopic position through the first friction plate and the second friction plate overlapping with each other;
a telescopic adjustment long slit that is formed in the first friction plate lengthwise in a telescopic positioning direction and allows the tightening rod to be inserted; and
a long slit that is formed in the second friction plate and allows the tightening rod to be inserted.

2. The steering device according to claim 1,
wherein the second friction plate is formed lengthwise in a direction orthogonal to a telescopic positioning direction.

3. The steering device according to claim 1,
wherein the second friction plate is formed lengthwise in a direction orthogonal to a telescopic positioning direction and in the telescopic positioning direction.

4. The steering device according to claim 1,
wherein the long slit in the second friction plate is formed lengthwise toward the first rocking support section of the second friction plate.

5. The steering device according to claim 1, comprising:
atilt adjustment long slit that is formed in the mounting bracket lengthwise in a tilt positioning direction and allows the tightening rod to be inserted,
wherein the mounting bracket supports the column so as to be able to adjust a tilt position and a telescopic position.

6. The steering device according to claim 1,
wherein the first friction plate and the second friction plate are sandwiched between an inner surface of a side plate for the mounting bracket and the column.

7. The steering device according to claim 6,
wherein the first rocking support section includes a columnar protrusion formed on the second friction plate and a circular recess that is formed in the column and rockingly supports the columnar protrusion.

8. The steering device according to claim 6, comprising
a telescopic adjustment long slit that is formed in the mounting bracket longwise in a tilt positioning direction and allows the tightening rod to be inserted;
a third friction plate that is sandwiched between the first friction plate and the side plate of the mounting bracket and is rockingly supported by a second rocking support section on the side plate of the mounting bracket; and
a long slit that is formed in the third friction plate lengthwise toward the second rocking support section and allows the tightening rod to be inserted.

9. The steering device according to claim 6, comprising
a cylindrical hole formed in the first rocking support section of the second friction plate; and
a protrusion that is formed on the first friction plate and is fit into the cylindrical hole to rockingly support the second friction plate.

\* \* \* \* \*